(12) United States Patent
Makimoto et al.

(10) Patent No.: US 11,897,316 B2
(45) Date of Patent: Feb. 13, 2024

(54) REFRIGERATION CYCLE DEVICE

(71) Applicant: DENSO CORPORATION, Kariya (JP)

(72) Inventors: Naoya Makimoto, Kariya (JP); Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 436 days.

(21) Appl. No.: 17/343,279

(22) Filed: Jun. 9, 2021

(65) Prior Publication Data
US 2021/0291626 A1 Sep. 23, 2021

Related U.S. Application Data

(63) Continuation of application No. PCT/JP2019/049728, filed on Dec. 19, 2019.

(30) Foreign Application Priority Data

Dec. 26, 2018 (JP) .................................. 2018-243391
Nov. 29, 2019 (JP) .................................. 2019-216880

(51) Int. Cl.
*B60H 1/22* (2006.01)
*B60H 1/32* (2006.01)

(52) U.S. Cl.
CPC ............. *B60H 1/22* (2013.01); *B60H 1/3204* (2013.01)

(58) Field of Classification Search
CPC .... B60H 1/22; B60H 1/3204; B60H 1/00485; B60H 1/32284; B60H 2001/0092; B60H 2001/00949; B60H 1/00899; B60H 2001/00307; B60H 1/00278
See application file for complete search history.

(56) References Cited

U.S. PATENT DOCUMENTS

| | | | | |
|---|---|---|---|---|
| 6,047,770 A | * | 4/2000 | Suzuki | ................. B60H 1/3204 62/526 |
| 2016/0031291 A1 | | 2/2016 | Enomoto et al. | |
| 2016/0297283 A1 | | 10/2016 | Sakamoto et al. | |
| 2017/0197490 A1 | * | 7/2017 | Enomoto | ........... B60H 1/00485 |

(Continued)

FOREIGN PATENT DOCUMENTS

| | | |
|---|---|---|
| EP | 2437955 A1 | 4/2012 |
| JP | 2014-201224 A | 10/2014 |
| JP | 2015101180 A | 6/2015 |

(Continued)

*Primary Examiner* — Kun Kai Ma
(74) *Attorney, Agent, or Firm* — Harness, Dickey & Pierce, P.L.C.

(57) ABSTRACT

A refrigeration cycle device includes a high-temperature heating medium regulator and a controller. The high-temperature heating medium regulator regulates a high-temperature heating medium flow ratio between the flow rate of high-temperature heating medium flowing in an air heater and the flow rate of high-temperature heating medium flowing in a radiator. The controller controls the high-temperature heating medium regulator to regulate the high-temperature heating medium flow ratio such that excess heat is radiated to air outside the cabin by the radiator, of the heat radiated from the refrigerant to the high-temperature heating medium by a high-pressure-side heat exchanger, with respect to heat required for heating air blown into a cabin by the air heater to have a target outlet temperature.

4 Claims, 11 Drawing Sheets

(56) References Cited

U.S. PATENT DOCUMENTS

2019/0030989 A1    1/2019   Miura et al.

FOREIGN PATENT DOCUMENTS

| JP | 2016003828 A | | 1/2016 | | |
|---|---|---|---|---|---|
| JP | 2017062065 A | | 3/2017 | | |
| JP | 2017161121 A | | 9/2017 | | |
| JP | 2019105409 A | * | 6/2019 | | |
| WO | WO-2010139582 A1 | | 12/2010 | | |
| WO | WO-2019031221 A1 | * | 2/2019 | ............... | B60H 1/22 |
| WO | WO-2019065039 A1 | * | 4/2019 | ............... | B60H 1/22 |
| WO | WO-2019138695 A1 | * | 7/2019 | ............... | B60H 1/04 |
| WO | WO-2019138696 A1 | * | 7/2019 | | |

* cited by examiner

X-X

REFRIGERATION CYCLE DEVICE

CROSS REFERENCE TO RELATED APPLICATION

The present application is a continuation application of International Patent Application No. PCT/JP2019/049728 filed on Dec. 19, 2019, which designated the U.S. and claims the benefit of priority from Japanese Patent Application No. 2018-243391 filed on Dec. 26, 2018 and Japanese Patent Application No. 2019-216880 filed on Nov. 29, 2019. The entire disclosures of all of the above applications are incorporated herein by reference.

TECHNICAL FIELD

The present disclosure relates to a refrigeration cycle device.

BACKGROUND ART

Conventionally, in a heat management device for a vehicle, coolant heated by a condenser of a refrigeration cycle flows in a heater core and a radiator. The heater core exchanges heat between the air blown into a cabin and the coolant to heat the air. The radiator exchanges heat between the coolant and the air outside the cabin to cool the coolant. Electric equipment such as an inverter is cooled by the coolant cooled by a first evaporator of the refrigeration cycle, and the air blown into the cabin is cooled by a second evaporator of the refrigeration cycle. Heat absorbed by a refrigerant in each of the first evaporator and the second evaporator and heat generated by a compressor in the refrigeration cycle are applied from the refrigerant to the coolant in the condenser.

SUMMARY

A high-temperature heating medium circulates through a high-temperature heating medium circuit. An air heater exchanges heat between the high-temperature heating medium and air blown into a cabin to heat the air. A radiator exchanges heat between the high-temperature heating medium and air outside the cabin to radiate the heat to the air outside the cabin. A compressor sucks, compresses, and discharges a refrigerant. A high-pressure-side heat exchanger exchanges heat between the high-pressure refrigerant discharged from the compressor and the high-temperature heating medium to radiate heat from the refrigerant to the high-temperature heating medium. A decompression part decompresses the refrigerant subjected to the heat exchange by the high-pressure-side heat exchanger. An evaporator absorbs heat into the refrigerant decompressed by the decompression part to evaporate the refrigerant. A flow rate regulator regulates a radiator-side flow ratio being a ratio of a flow rate of the high-temperature heating medium flowing in the radiator to a flow rate of the high-temperature heating medium flowing in the high-pressure-side heat exchanger. A maximum outlet temperature that is a maximum value of a temperature of air heated by the air heater increases as the radiator-side flow ratio decreases. A rate of increase in the maximum outlet temperature with respect to a decrease in the radiator-side flow ratio increases as the radiator-side flow ratio decreases.

DESCRIPTION OF EMBODIMENTS

Figure 1:
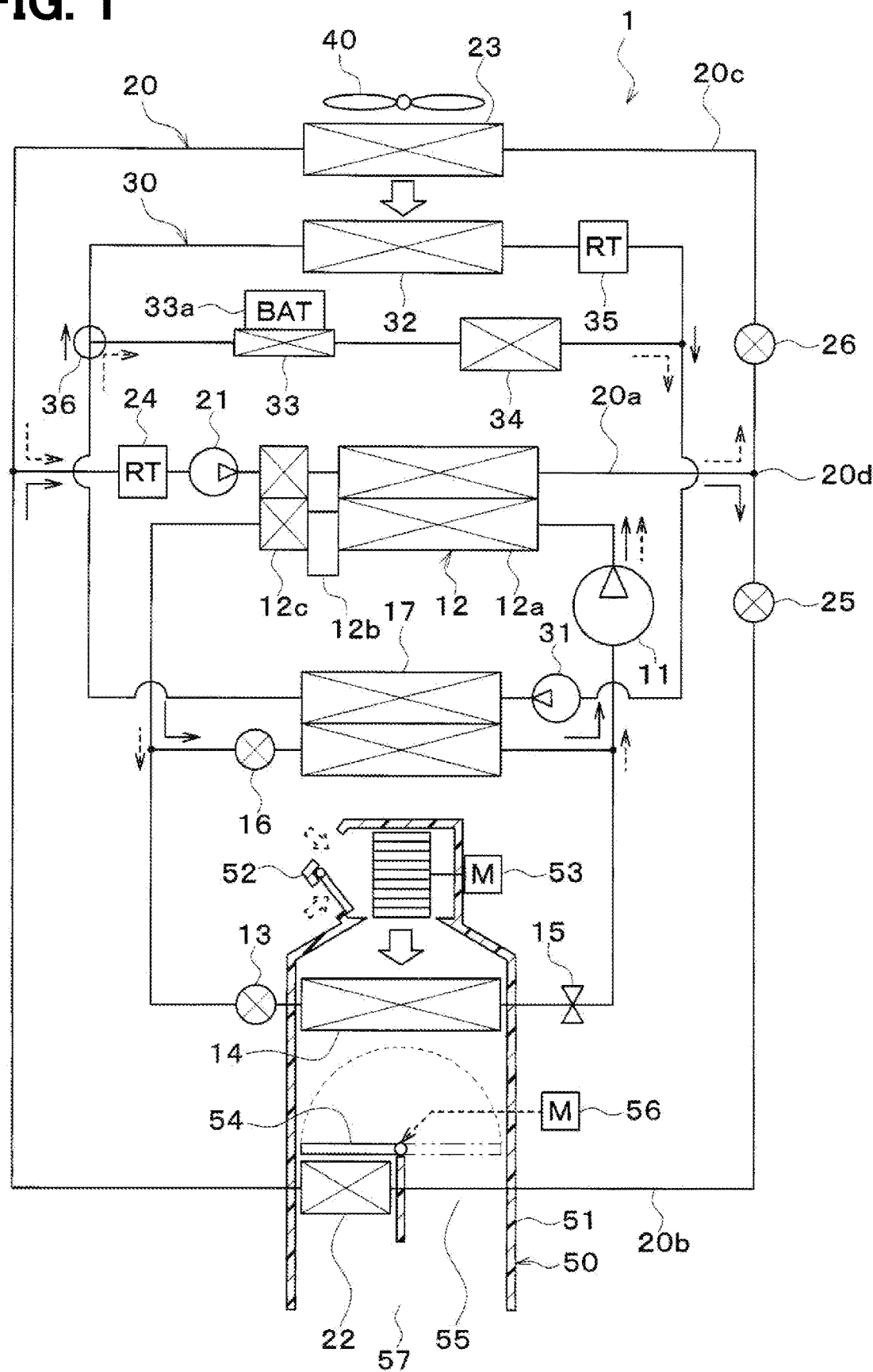
FIG. 1 illustrates an overall configuration diagram of a refrigeration cycle device according to a first embodiment.

To begin with, examples of relevant techniques will be described.

Conventionally, in a heat management device for a vehicle, coolant heated by a condenser of a refrigeration cycle flows in a heater core and a radiator. The heater core exchanges heat between the air blown into a cabin and the coolant to heat the air. The radiator exchanges heat between the coolant and the air outside the cabin to cool the coolant. Hereinafter, the air outside the cabin is referred to as outside air.

Electric equipment such as an inverter is cooled by the coolant cooled by a first evaporator of the refrigeration cycle, and the air blown into the cabin is cooled by a second evaporator of the refrigeration cycle.

Heat absorbed by a refrigerant in each of the first evaporator and the second evaporator and heat generated by a compressor in the refrigeration cycle are applied from the refrigerant to the coolant in the condenser.

The heat applied to the coolant from the condenser is distributed to the heater core and the radiator. Thus, depending on the flow rate of the coolant flowing in the heater core and the radiator, the air heating capacity in the heater core may be excessive or insufficient.

The present disclosure enables appropriate heating of air blown into a cabin in a refrigeration cycle device that uses a heating medium heated by a refrigerant for heating the air blown into the cabin and simultaneously radiates heat to the outside air.

It is conceivable that the coolant cooled by the first evaporator of the refrigeration cycle is allowed to flow in the heat absorbing radiator and a battery so as to ensure the heat required for heating the air by the heater core.

The heat absorbing radiator is a heat exchanger for absorbing heat from outside air into the coolant cooled by the first evaporator of the refrigeration cycle. By allowing the coolant cooled by the first evaporator of the refrigeration cycle to flow in the battery, heat can be absorbed from the battery by the coolant cooled by the first evaporator of the refrigeration cycle to cool the battery.

With such a configuration, since the coolant cooled by the refrigerant in the first evaporator absorbs heat from the heat absorbing radiator and the battery, the ability to cool the battery is insufficient depending on the flow rate of the coolant flowing in the heat absorbing radiator and the battery.

The present disclosure provides a refrigeration cycle device that can appropriately cool the battery. A heating medium cooled by a refrigerant for heating air blown into a cabin absorbs heat from outside air, and simultaneously, the battery is cooled by the heating medium cooled by the refrigerant.

According to a first aspect of the present disclosure, a refrigeration cycle device includes: a high-temperature heating medium circuit, an air heater, a radiator, a compressor, a high-pressure-side heat exchanger, a decompression part, a plurality of evaporators, a refrigerant flow switching part, a high-temperature heating medium regulator and a controller.

A high-temperature heating medium circulates through the high-temperature heating medium circuit. The air heater heats air blown into the cabin by exchanging heat between the high-temperature heating medium and the air. The radiator exchanges heat between the high-temperature heating medium and air outside the cabin to radiate the heat to the air outside the cabin. The compressor sucks, compresses, and discharges a refrigerant. The high-pressure-side heat exchanger exchanges heat between the high-pressure refrigerant discharged from the compressor and the high-temperature heating medium to radiate heat from the refrigerant to the high-temperature heating medium. The decompression part decompresses the refrigerant subjected to the heat exchange by the high-pressure-side heat exchanger. The evaporators absorb heat into the refrigerant decompressed by the decompression part to evaporate the refrigerant. The refrigerant flow switching part switches between a state in which the refrigerant flows in some of the evaporators and a state in which the refrigerant flows in all of the evaporators. The high-temperature heating medium regulator regulates a high-temperature heating medium flow ratio being a ratio between a flow rate of the high-temperature heating medium flowing in the air heater and a flow rate of the high-temperature heating medium flowing in the radiator. The controller controls the high-temperature heating medium regulator so that the high-temperature heating medium flow ratio is obtained at which, of the heat radiated from the refrigerant to the high-temperature heating medium by the high-pressure-side heat exchanger, excess heat with respect to heat required for heating the air blown into the cabin by the air heater to the target outlet temperature is radiated to air outside the cabin by the radiator.

Thus, the heating medium can be allowed to flow in the air heater so that heat required for heating the air blown into the cabin by the air heater to a target outlet temperature is distributed to the air heater. Therefore, the air blown into the cabin can be appropriately heated by the air heater.

According to a second aspect of the present disclosure, a refrigeration cycle device includes: a low-temperature heating medium circuit, a heat absorber, a battery, a compressor, an air heating part, a decompression part, an evaporator, a low-temperature heating medium regulator and a controller.

A low-temperature heating medium circulates through the low-temperature heating medium circuit. The heat absorber exchanges heat between the low-temperature heating medium and air blown to an outside of a cabin to absorb heat from air outside the cabin to the low-temperature heating medium. The battery is cooled by the low-temperature heating medium. The compressor sucks, compresses, and discharge the refrigerant. The air heating part radiates heat of the high-pressure refrigerant discharged from the compressor to heat the air blown into the cabin. The decompression part decompresses the refrigerant radiated by the air heating part. The evaporator exchanges heat between the refrigerant decompressed by the decompression part and the low-temperature heating medium to evaporate the refrigerant and cool the low-temperature heating medium. The low-temperature heating medium regulator regulates a low-temperature heating medium flow ratio being a ratio between a flow rate of the low-temperature heating medium flowing in the heat absorber and a flow rate of the low-temperature heating medium cooling the battery. The controller controls the low-temperature heating medium regulator so that the low-temperature heating medium flow ratio is obtained at which the battery is cooled to a target battery temperature.

This allows the heating medium to flow in the battery so that the battery reaches a target battery temperature. Therefore, the battery can be appropriately cooled while the air blown into the cabin is heated.

According to a third aspect of the present disclosure, a refrigeration cycle device includes: a high-temperature heating medium circuit, an air heater, a radiator, a compressor, a high-pressure-side heat exchanger, a decompression part, an evaporator, and a flow rate regulator.

A high-temperature heating medium circulates through the high-temperature heating medium circuit. The air heater exchanges heat between the high-temperature heating medium and air blown into a cabin to heat the air blown into the cabin. The radiator exchanges heat between the high-temperature heating medium and air outside the cabin to radiate the heat to the air outside the cabin. The compressor sucks, compresses, and discharges a refrigerant. The high-pressure-side heat exchanger exchanges heat between the high-pressure refrigerant discharged from the compressor and the high-temperature heating medium to radiate heat from the refrigerant to the high-temperature heating medium. The decompression part decompresses the refrigerant subjected to the heat exchange by the high-pressure-side heat exchanger. The evaporator absorbs heat into the refrigerant decompressed by the decompression part to evaporate the refrigerant. The flow rate regulator regulates a radiator-side flow ratio being a ratio of a flow rate of the high-temperature heating medium flowing in the radiator to a flow rate of the high-temperature heating medium flowing in the high-pressure-side heat exchanger. A maximum outlet temperature that is a maximum value of a temperature of air heated by the air heater increases as the radiator-side flow ratio decreases. A rate of increase in the maximum outlet temperature with respect to a decrease in the radiator-side flow ratio increases as the radiator-side flow ratio decreases.

According to this, the air heated by the air heater can be heated to an appropriate temperature by setting a resolution of a flow rate regulator in consideration of the maximum outlet temperature, even when a radiator-side flow ratio is small.

According to a fourth aspect of the present disclosure, a flow rate adjustment mechanism is used in a refrigeration cycle device including: a high-temperature heating medium circuit, an air heater, a radiator, a compressor, a high-pressure-side heat exchanger, a decompression part, and an evaporator.

A high-temperature heating medium circulates through the high-temperature heating medium circuit. The air heater exchanges heat between the high-temperature heating medium and air blown into a cabin to heat the air blown into the cabin. The radiator exchanges heat between the high-temperature heating medium and air outside the cabin to radiate the heat to the air outside the cabin. The compressor sucks, compresses, and discharges a refrigerant. The high-pressure-side heat exchanger exchanges heat between the high-pressure refrigerant discharged from the compressor and the high-temperature heating medium to radiate heat from the refrigerant to the high-temperature heating medium. The decompression part decompresses the refrigerant subjected to the heat exchange by the high-pressure-side heat exchanger. The evaporator absorbs heat into the refrigerant decompressed by the decompression part to evaporate the refrigerant.

In the refrigeration cycle device, a maximum outlet temperature that is a maximum value of a temperature of air heated by the air heater increases as a radiator-side flow ratio decreases, the radiator-side flow ratio being a ratio of a flow rate of the high-temperature heating medium flowing in the radiator to a flow rate of the high-temperature heating medium flowing in the high-pressure-side heat exchanger. In the refrigeration cycle device, a rate of increase in the maximum outlet temperature with respect to a decrease in the radiator-side flow ratio becomes larger as the radiator-side flow ratio decreases.

The flow rate adjustment mechanism is capable of regulating the radiator-side flow ratio so that a fluctuation range of the temperature of the air heated by the air heater becomes equal to or less than an allowable value, at the radiator-side flow ratio when the maximum outlet temperature becomes an upper limit outlet temperature that is an upper limit of the temperature of the air heated by the air heater.

As a result, the fluctuation range of air heated by the air heater can be controlled to be lower than or equal to the allowable value even if the radiator-side flow ratio is low, so that the air heated by the air heater can be heated to an appropriate temperature.

According to a fifth aspect of the present disclosure, a flow rate adjustment mechanism is used in a refrigeration cycle device including: a high-temperature heating medium circuit, an air heater, a radiator, a compressor, a high-pressure-side heat exchanger, a decompression part, and an evaporator.

A high-temperature heating medium circulates through the high-temperature heating medium circuit. The air heater exchanges heat between the high-temperature heating medium and air blown into a cabin to heat the air blown into the cabin. The radiator exchanges heat between the high-temperature heating medium and air outside the cabin to radiate the heat to the air outside the cabin. The compressor sucks, compresses, and discharges a refrigerant. The high-pressure-side heat exchanger exchanges heat between the high-pressure refrigerant discharged from the compressor and the high-temperature heating medium to radiate heat from the refrigerant to the high-temperature heating medium. The decompression part decompresses the refrigerant subjected to the heat exchange by the high-pressure-side heat exchanger. The evaporator absorbs heat into the refrigerant decompressed by the decompression part to evaporate the refrigerant.

The flow rate adjustment mechanism can regulate a radiator-side flow ratio that is a ratio of a flow rate of the high-temperature heating medium flowing in the radiator to a flow rate of the high-temperature heating medium flowing in the high-pressure-side heat exchanger at a predetermined resolution.

As a result, the fluctuation range of the radiator-side flow ratio can be appropriately controlled at the time of regulating the radiator-side flow ratio, so that the air heated by the air heater can be heated to an appropriate temperature.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

An embodiment will be described below with reference to the drawings. A vehicular air conditioner 1 illustrated in FIGS. 1 to 4 is for the space in a cabin (i.e., space to be air-conditioned) to have an appropriate temperature. The vehicular air conditioner 1 includes a refrigeration cycle device 10. In the present embodiment, the refrigeration cycle device 10 is mounted on a hybrid vehicle that obtains a driving force from an engine (i.e., an internal combustion engine) and an electric motor.

The hybrid vehicle of the present embodiment is configured as a plug-in hybrid vehicle capable of charging a battery (i.e., on-vehicle battery) mounted on the vehicle with electric power supplied from an external electric power source (i.e., commercial power source) when the vehicle is stopped. As the battery, for example, a lithium-ion battery can be used.

The driving force output from the engine is used not only for the vehicle traveling but also for operating a generator. The electric power generated by the generator and the electric power supplied from an external electric power source can be stored in the battery, and the electric power stored in the battery is supplied not only to the electric motor but also to various on-vehicle devices including electric components of the refrigeration cycle device 10.

The refrigeration cycle device 10 is a vapor compression type refrigerator provided with a compressor 11, a condenser 12, a first expansion valve 13, an air-side evaporator 14, a constant pressure valve 15, a second expansion valve 16, and a cooling-water-side evaporator 17. In the refrigeration cycle device 10 of the present embodiment, a fluorocarbon refrigerant is used as the refrigerant, and a subcritical refrigeration cycle is constituted in which the pressure of the high-pressure-side refrigerant does not exceed the critical pressure of the refrigerant.

The second expansion valve 16 and the cooling-water-side evaporator 17 are disposed in parallel with the first expansion valve 13, the air-side evaporator 14, and the constant pressure valve 15 in the refrigerant flow.

In the refrigeration cycle device 10, a first refrigerant circulation circuit and a second refrigerant circulation circuit are formed. In the first refrigerant circulation circuit, the refrigerant circulates in the order of the compressor 11, the condenser 12, the first expansion valve 13, the air-side evaporator 14, the constant pressure valve 15, and the compressor 11. In the second refrigerant circulation circuit, the refrigerant circulates in the order of the compressor 11, the condenser 12, the second expansion valve 16, and the cooling-water-side evaporator 17.

The compressor 11 is an electric compressor driven by electric power supplied from a battery and sucks, compresses, and discharges the refrigerant of the refrigeration cycle device 10. The electric motor of the compressor 11 is controlled by a controller 60. The compressor 11 may be a variable displacement compressor driven by a belt.

The condenser 12 is a high-pressure-side heat exchanger for exchanging heat between the high-pressure-side refrigerant discharged from the compressor 11 and the cooling water of a high-temperature cooling water circuit 20.

The condenser 12 includes a condensation part 12a, a receiver 12b, and a supercooling part 12c. The condensation part 12a exchanges heat between the high-pressure-side refrigerant discharged from the compressor 11 and the cooling water of the high-temperature cooling water circuit 20 to condense the high-pressure-side refrigerant.

The cooling water of the high-temperature cooling water circuit 20 is fluid as a heating medium. The cooling water of the high-temperature cooling water circuit 20 is a high-temperature heating medium. In the present embodiment, a liquid containing at least ethylene glycol, dimethylpolysiloxane, or nanofluid, or an antifreeze liquid body, is used as the cooling water of the high-temperature cooling water circuit 20. The high-temperature cooling water circuit 20 is a high-temperature heating medium circuit in which a high-temperature heating medium circulates.

The receiver 12b is a gas-liquid separation part that separates the gas-liquid of the high-pressure refrigerant flowing out of the condenser 12 and allows the separated liquid-phase refrigerant to flow out to the downstream side while storing the excess refrigerant in the cycle.

The supercooling part 12c exchanges heat between the liquid-phase refrigerant flowing out of the receiver 12b and the cooling water of the high-temperature cooling water circuit 20 to supercool the liquid-phase refrigerant.

The first expansion valve 13 is a first decompression part for decompressing and expanding the liquid-phase refrigerant flowing out of the receiver 12b. The first expansion valve 13 is a mechanical temperature-type expansion valve. The mechanical expansion valve is a temperature-type expansion valve having a temperature sensitive part and driving a valve element by using a mechanical mechanism such as a diaphragm.

The air-side evaporator 14 is an evaporator that exchanges heat between the refrigerant flowing out of the first expansion valve 13 and the air blown into the cabin to evaporate the refrigerant. In the air-side evaporator 14, the refrigerant absorbs heat from the air blown into the cabin. The air-side evaporator 14 is an air cooler for cooling the air blown into the cabin.

The constant pressure valve 15 is a pressure regulator for maintaining the pressure of the refrigerant at the outlet side of the air-side evaporator 14 at a predetermined value. The constant pressure valve 15 is formed of a mechanical variable throttle mechanism. Specifically, the constant pressure valve 15 decreases a passage area (i.e., throttle opening) of a refrigerant passage when the pressure of the refrigerant on the outlet side of the air-side evaporator 14 falls below a predetermined value, and the constant pressure valve 15 increases the passage area (i.e., throttle opening) of the refrigerant passage when the pressure of the refrigerant on the outlet side of the air-side evaporator 14 exceeds the predetermined value. The vapor phase refrigerant with its pressure regulated by the constant pressure valve 15 is sucked into the compressor 11 and compressed.

In a case where there is little fluctuation in the flow rate of the circulating refrigerant circulating through the cycle or some other case, instead of the constant pressure valve 15, a fixed throttle made of an orifice, a capillary tube, or the like may be employed.

The second expansion valve 16 is a second decompression part for reducing and expanding the liquid-phase refrigerant flowing out of the condenser 12. The second expansion valve 16 is an electric expansion valve. The electric expansion valve is an electric variable throttle mechanism including a valve element configured to change the throttle opening and an electric actuator for changing the opening of the valve element. The second expansion valve 16 can fully close a refrigerant passage.

The second expansion valve 16 is a refrigerant flow switching part for switching between a state in which a refrigerant flows in the air-side evaporator 14 out of the air-side evaporator 14 and the cooling-water-side evaporator 17 and a state in which the refrigerant flows in both the air-side evaporator 14 and the cooling-water-side evaporator 17.

The operation of the second expansion valve 16 is controlled by a control signal output from the controller 60. The second expansion valve 16 may be a mechanical temperature expansion valve. When the second expansion valve 16 is a mechanical temperature expansion valve, an on-off valve for opening and closing the refrigerant passage needs to be provided separately from the second expansion valve 16.

The cooling-water-side evaporator 17 exchanges heat between the refrigerant flowing out of the second expansion valve 16 and the cooling water of a low-temperature cooling water circuit 30 to evaporate the refrigerant. In the cooling-water-side evaporator 17, the refrigerant absorbs heat from the cooling water of the low-temperature cooling water circuit 30. The cooling-water-side evaporator 17 is a heating medium cooler for cooling the cooling water of the low-temperature cooling water circuit 30. A vapor phase refrigerant evaporated by the cooling-water-side evaporator 17 is sucked into the compressor 11 and compressed.

The cooling water of the low-temperature cooling water circuit 30 is fluid as a heating medium. The cooling water of the low-temperature cooling water circuit 30 is a low-temperature heating medium. In the present embodiment, a liquid containing at least ethylene glycol, dimethylpolysiloxane, or nanofluid, or an antifreeze liquid body, is used as the cooling water of the low-temperature cooling water circuit 30. The low-temperature cooling water circuit 30 is a low-temperature heating medium circuit in which a low-temperature heating medium circulates.

In the high-temperature cooling water circuit 20, the condenser 12, a high-temperature-side pump 21, a heater core 22, a high-temperature-side radiator 23, a high-temperature-side reserve tank 24, a heater core passage open/close valve 25, and a radiator passage open/close valve 26 are disposed.

The high-temperature-side pump 21 is a heating medium pump for sucking and discharging cooling water. The high-temperature-side pump 21 is an electric pump. The hightemperature-side pump 21 is an electric pump having a constant discharge flow rate, but the high-temperature-side pump 21 may be an electric pump having a variable discharge flow rate.

The heater core 22 is an air heater that exchanges heat between the cooling water of the high-temperature cooling water circuit 20 and the air blown into the cabin to heat the air blown into the cabin. In the heater core 22, cooling water radiates heat to the air blown into the cabin.

The condenser 12 and the heater core 22 are each an air heating part that radiates the high-pressure refrigerant discharged from the compressor 11 to heat the air blown into the cabin.

The high-temperature-side radiator 23 is a radiator that exchanges heat between the cooling water of the high-temperature cooling water circuit 20 and the outside air to radiate heat from the cooling water to the outside air.

The high-temperature-side reserve tank 24 is a cooling water storage part for storing excess cooling water. By storing the excess cooling water in the high-temperature-side reserve tank 24, it is possible to restrict a decrease in the amount of the cooling water circulating in each passage.

The high-temperature-side reserve tank 24 is a closed type reserve tank or an atmospheric open type reserve tank. The closed type reserve tank is a reserve tank for setting the pressure of the stored cooling water at the liquid level to a predetermined pressure. The atmospheric open type reserve tank is a reserve tank for setting the pressure of the stored cooling water at the liquid level to atmospheric pressure.

The condenser 12, the high-temperature-side pump 21, and the high-temperature-side reserve tank 24 are disposed in a condenser passage 20a. The condenser passage 20a is a passage through which the cooling water of the high-temperature cooling water circuit 20 flows.

The heater core 22 and the heater core passage open/close valve 25 are disposed in a heater core passage 20b. The heater core passage 20b is a passage through which the cooling water of the high-temperature cooling water circuit 20 flows. The heater core passage open/close valve 25 is a solenoid valve for opening and closing the heater core passage 20b. The operation of the heater core passage open/close valve 25 is controlled by the controller 60.

The high-temperature-side radiator 23 and the radiator passage open/close valve 26 are disposed in a radiator passage 20c. The radiator passage 20c is a passage through which the cooling water of the high-temperature cooling water circuit 20 flows in parallel to the heater core 22. The radiator passage open/close valve 26 is a solenoid valve for opening and closing the radiator passage 20c. The operation of the radiator passage open/close valve 26 is controlled by the controller 60.

The heater core passage open/close valve 25 is disposed between a high-temperature-side branch 20d, which is a branch between the heater core passage 20b and the radiator passage 20c, and the heater core 22 in the high-temperature cooling water circuit 20. The heater core passage open/close valve 25 regulates the flow rate of the cooling water of the high-temperature cooling water circuit 20 flowing into the heater core 22.

The radiator passage open/close valve 26 is disposed between the high-temperature-side branch 20d and the high-temperature-side radiator 23 in the high-temperature cooling water circuit 20. The radiator passage open/close valve 26 regulates the flow rate of the cooling water of the high-temperature cooling water circuit 20 flowing into the high-temperature-side radiator 23.

The heater core passage open/close valve 25 and the radiator passage open/close valve 26 are each a high-temperature heating medium regulator for regulating a flow ratio between a flow rate of cooling water flowing in the heater core 22 and a flow rate of cooling water flowing in the high-temperature-side radiator 23. The ratio between the flow rate of cooling water flowing in the heater core 22 and the flow rate of cooling water flowing in the high-temperature-side radiator 23 is a high-temperature heating medium flow ratio. The radiator passage open/close valve 26 is a radiator-side regulator. The heater core passage open/close valve 25 is an air-heater-side regulator. The heater core passage open/close valve 25 and the radiator passage open/close valve 26 are each a flow rate adjustment mechanism for regulating the flow rate of cooling water (i.e., flow rate adjustment mechanism).

In the low-temperature cooling water circuit 30, a low-temperature-side pump 31, the cooling-water-side evaporator 17, a low-temperature-side radiator 32, a battery 33, a charger 34, and a low-temperature-side reserve tank 35 are disposed.

The low-temperature-side pump 31 is a heating medium pump for sucking and discharging cooling water. The low-temperature-side pump 31 is an electric pump. The low-temperature-side radiator 32 is a heat absorber that exchanging heat between the cooling water of the low-temperature cooling water circuit 30 and the outside air to absorb heat from the outside air into the cooling water of the low-temperature cooling water circuit 30.

The high-temperature-side radiator 23 and the low-temperature-side radiator 32 are disposed in series in this order in the flow direction of the outside air. Outside air is blown to the high-temperature-side radiator 23 and the low-temperature-side radiator 32 by an outdoor blower 40.

The outdoor blower 40 is an outside air blowing part for blowing outside air toward the high-temperature-side radiator 23 and the low-temperature-side radiator 32. The outdoor blower 40 is an electric blower for driving a fan by an electric motor. The operation of the outdoor blower 40 is controlled by the controller 60.

The high-temperature-side radiator 23, the low-temperature-side radiator 32, and the outdoor blower 40 are disposed in the foremost portion of the vehicle. Accordingly, during the traveling of the vehicle, the traveling wind can be applied to the high-temperature-side radiator 23 and the low-temperature-side radiator 32.

The charger 34 is equipment for charging the battery 33 with electric power. The battery 33 and the charger 34 are each on-vehicle equipment mounted on the vehicle and heating equipment that generates heat when operated. The battery 33 and the charger 34 radiate the waste heat generated with the operation to the cooling water of the low-temperature cooling water circuit 30. In other words, the battery 33 and the charger 34 supply heat to the cooling water of the low-temperature cooling water circuit 30.

The low-temperature-side reserve tank 35 is a cooling water storage part for storing excess cooling water. By storing the excess cooling water in the low-temperature-side reserve tank 35, it is possible to restrict a decrease in the amount of the cooling water circulating in each passage. The low-temperature-side reserve tank 35 is a closed type reserve tank or an atmospheric open type reserve tank.

A three-way valve 36 is disposed in the low-temperature cooling water circuit 30. The three-way valve 36 is a low-temperature heating medium regulator for regulating a flow ratio between a flow rate of cooling water flowing toward the battery 33 and a flow rate of cooling water flowing toward the low-temperature-side radiator 32. The flow ratio between the flow rate of the cooling water flowing to the battery 33 to the flow rate of the cooling water flowing to the low-temperature-side radiator 32 is a low-temperature heating medium flow ratio. The three-way valve 36 is a heating medium flow switching part for switching between a state in which the cooling water flows in the low-temperature-side radiator 32 and a state in which the cooling water does not flow. The operation of the three-way valve 36 is controlled by the controller 60.

The air-side evaporator 14 and the heater core 22 are housed in an air conditioning casing 51 of the cabin inside air conditioning unit 50. The cabin inside air conditioning unit 50 is disposed inside an instrument panel (not illustrated) in the front part of the cabin. The air conditioning casing 51 is an air passage formation member for forming an air passage.

The heater core 22 is disposed downstream of the air-side evaporator 14 in the air flow, in the air passage in the air conditioning casing 51. An inside/outside air switching box 52 and an indoor blower 53 are disposed in the air conditioning casing 51.

The inside/outside air switching box 52 is an inside/outside air switching part for switching and introducing inside air and outside air into the air passage in the air conditioning casing 51. The indoor blower 53 sucks and blows the inside air and outside air introduced into the air passage in the air conditioning casing 51 through the inside/outside air switching box 52. The operation of the indoor blower 53 is controlled by the controller 60.

An air-mix door 54 is disposed between the air-side evaporator 14 and the heater core 22 in an air passage in an air conditioning casing 51. The air-mix door 54 regulates the air volume ratio between cold air flowing into the heater core 22 and cold air flowing in a cold air bypass passage 55 out of cold air having passed through the air-side evaporator 14.

The cold air bypass passage 55 is an air passage in which the cold air having passed through the air-side evaporator 14 flows by bypassing the heater core 22.

The air-mix door 54 is a rotary door having a rotary shaft rotatably supported to the air conditioning casing 51 and a door substrate part coupled to the rotary shaft. By regulating the opening position of the air-mix door 54, the temperature of the air conditioning air blown into the cabin from the air conditioning casing 51 can be regulated to a desired temperature.

The rotary shaft of the air-mix door 54 is driven by a servomotor 56. The operation of the air-mix door servomotor 56 is controlled by the controller 60.

The air-mix door 54 may be a sliding door that slides in a direction substantially orthogonal to the air flow. The sliding door may be a plate-like door formed of a rigid body. The film door may be formed of a flexible film material.

The air conditioning air regulated in temperature by the air-mix door 54 is blown out into the cabin from a blowout port 57 formed in the air conditioning casing 51.

Figure 2:
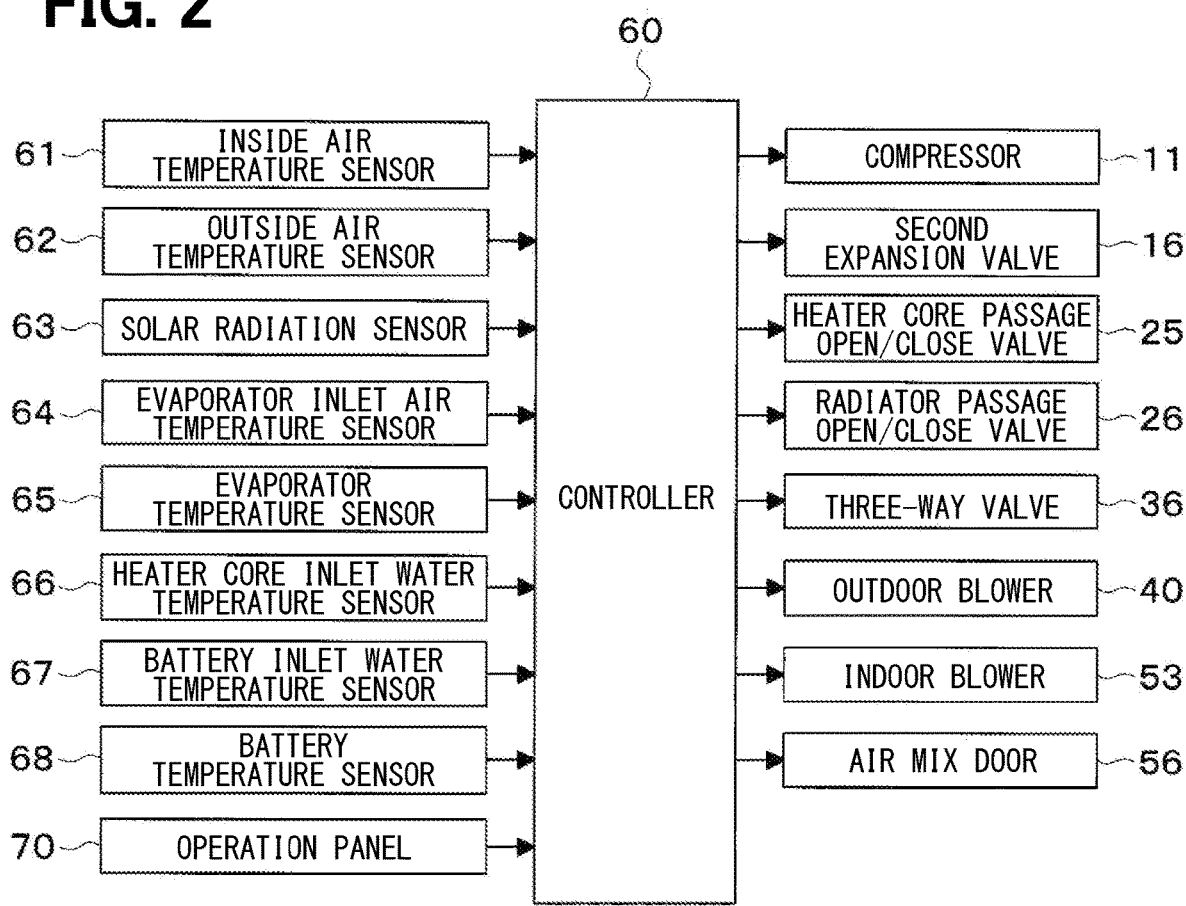
FIG. 2 is a block diagram illustrating an electrical controller of the refrigeration cycle device according to the first embodiment.
Figure 3:
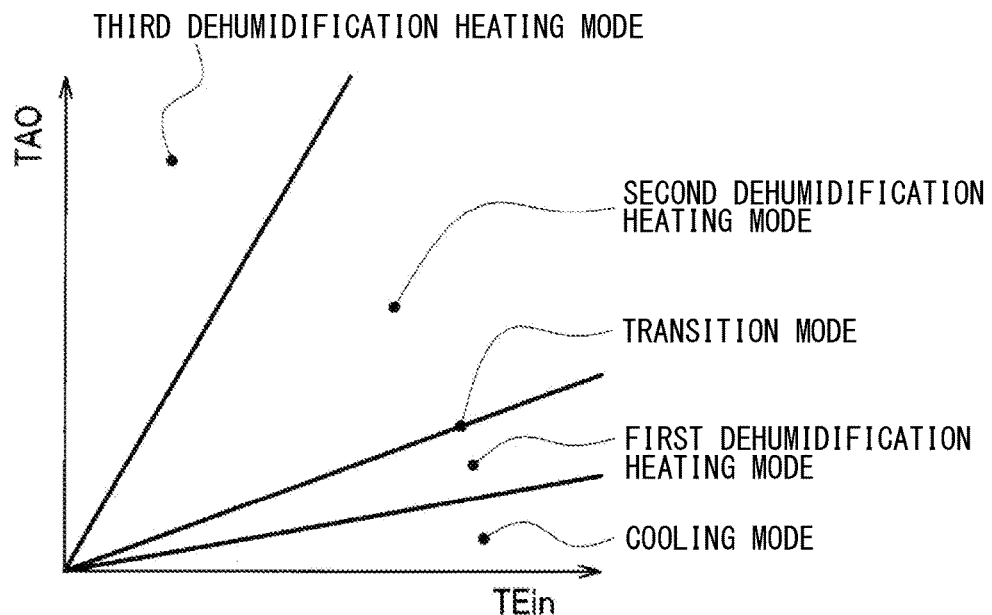
FIG. 3 is a control characteristic diagram that is used by the controller of the refrigeration cycle device according to the first embodiment for switching an operation mode.

The controller 60 illustrated in FIG. 2 is made up of a microcomputer including a central processing unit (CPU), a read-only memory (ROM), a random access memory (RAM) and the like, and peripheral circuits thereof. The controller 60 performs various operations and processing based on a control program stored in the ROM. Various devices to be controlled are connected to the output side of the controller 60. The controller 60 controls the operation of various devices to be controlled.

The devices to be controlled, which are controlled by the controller 60, includes the compressor 11, the second expansion valve 16, the heater core passage open/close valve 25, the radiator passage open/close valve 26, the three-way valve 36, the outdoor blower 40, the indoor blower 53, the air-mix door servomotor 56, and the like.

Software and hardware for controlling the electric motor of the compressor 11 in the controller 60 are a refrigerant discharge capacity controller. Software and hardware for controlling the second expansion valve 16 of the controller 60 are a throttle controller.

Software and hardware for controlling the heater core passage open/close valve 25 and the radiator passage open/close valve 26 in the controller 60 are a high-temperature heating medium flow controller.

Software and hardware for controlling the three-way valve 36 of the controller 60 is a low-temperature heating medium flow controller.

Software and hardware for controlling the outdoor blower 40 of the controller 60 are an outside air blowing capacity controller.

Software and hardware for controlling the indoor blower 53 of the controller 60 are an air blowing capacity controller.

Software and hardware for controlling the air-mix door servomotor 56 in the controller 60 are an air volume ratio controller.

The input side of the controller 60 is connected with a various control sensor group such as an inside air temperature sensor 61, an outside air temperature sensor 62, a solar radiation sensor 63, an evaporator inlet air temperature sensor 64, an evaporator temperature sensor 65, a heater core inlet water temperature sensor 66, a battery inlet water temperature sensor 67, and a battery temperature sensor 68.

The inside air temperature sensor 61 detects a cabin inside temperature Tr. The outside air temperature sensor 62 detects an outside air temperature Tam. The solar radiation sensor 63 detects a solar radiation amount Ts in the cabin.

The evaporator inlet air temperature sensor 64 is an air temperature detection part for detecting a temperature TEin of the air sucked into the air-side evaporator 14.

The evaporator temperature sensor 65 is a temperature detection part for detecting the temperature TE of the air-side evaporator 14. The evaporator temperature sensor 65 is, for example, a fin thermistor for detecting the temperature of a heat exchange fin of the air-side evaporator 14, a refrigerant temperature sensor for detecting the temperature of a refrigerant flowing in the air-side evaporator 14, and the like.

The heater core inlet water temperature sensor 66 is a heating medium temperature detection part for detecting a temperature THin of cooling water flowing into the heater core 22.

The battery inlet water temperature sensor 67 is a heating medium temperature detection part for detecting the temperature of cooling water flowing into the battery 33.

The battery temperature sensor 68 is a battery temperature detection part for detecting the temperature of the battery 33. For example, the battery temperature sensor 68 detects the temperature of each cell of the battery 33.

Various operation switches (not illustrated) are connected to the input side of the controller 60. Various operation switches are provided on an operation panel 70 and operated by an occupant. The operation panel 70 is disposed near the instrument panel in the front part of the cabin. The controller 60 receives inputs of operation signals from various operation switches.

The various operation switches are an air conditioner switch, a temperature setting switch, and the like. The air conditioner switch sets whether or not air is cooled by the cabin inside air conditioning unit 50. The temperature setting switch sets a set temperature in the cabin.

Next, the operation in the above configuration will be described. When the air conditioner switch of the operation panel 70 has been turned on by the occupant, the controller 60 switches the operation mode based on a sucked air temperature TEin of the air-side evaporator 14, a target outlet temperature TAO, and the like and a control map illustrated in FIG. 3. The operation modes include at least a cooling mode, a first dehumidification heating mode, a second dehumidification heating mode, and a third dehumidification heating mode.

The target outlet temperature TAO is the target temperature of the blowing air blown into the cabin. The controller 60 calculates the target outlet temperature TAO based on the following formula:

$$TAO = Kset \times Tset - Kr \times Tr - Kam \times Tam - Ks \times Ts + C$$

In this formula, Tset is a set temperature in the cabin set by the temperature setting switch of the operation panel 70, Tr is an inside air temperature detected by the inside air temperature sensor 61, Tam is an outside air temperature detected by the outside air temperature sensor 62, and Ts is the solar radiation amount detected by the solar radiation sensor 63. Kset, Kr, Kam, and Ks are control gains, and C is a constant for correction.

In the low-temperature range of the target outlet temperature TAO, the mode is switched to the cooling mode. As the target outlet temperature TAO becomes higher, the mode is switched in the order of: the first dehumidification heating mode, the second dehumidification heating mode, and the third dehumidification heating mode. The threshold of the target outlet temperature TAO increases as the sucked air temperature TEin of the air-side evaporator 14 becomes higher.

In the cooling mode, air blown into the cabin is cooled by an air-side evaporator 14 to cool the cabin.

In the first dehumidification heating mode, the second dehumidification heating mode, and the third dehumidification heating mode, the air blown into a cabin is cooled and dehumidified by the air-side evaporator 14, and the air cooled and dehumidified by the air-side evaporator 14 is heated by a heater core 22 to dehumidify and heat the cabin.

In the first dehumidification heating mode, the amount of heat of the cooling water in the high-temperature cooling water circuit 20 becomes excess to the amount of heat required for the heater core 22, and hence the excess heat of the cooling water in the high-temperature cooling water circuit 20 is radiated to the outside air by the high-temperature-side radiator 23. The first dehumidification heating mode is a heat radiation mode for radiating heat to the outside air by the high-temperature-side radiator 23.

In the second dehumidification heating mode, the amount of heat of the cooling water in the high-temperature cooling water circuit 20 is insufficient for the amount of heat required for the heater core 22, and hence the insufficient amount of heat is absorbed from the outside air by the low-temperature-side radiator 32. The second dehumidification heating mode is a heat absorption mode in which heat is absorbed from the outside air by the low-temperature-side radiator 32.

In the third dehumidification heating mode, the amount of heat of the cooling water in the high-temperature cooling water circuit 20 is insufficient for the amount of heat required for the heater core 22, and hence the insufficient amount of heat is absorbed from the outside air by the low-temperature-side radiator 32 at the maximum capacity within an allowable range.

The controller 60 temporarily executes a transition mode at the time of switching between the first dehumidification heating mode and the second dehumidification heating mode.

In the transition mode, the first dehumidification heating mode and the second dehumidification heating mode are performed simultaneously. That is, in the transition mode, heat is radiated from the cooling water of the high-temperature cooling water circuit 20 to the outside air by the high-temperature-side radiator 23 as in the first dehumidification heating mode, and heat is absorbed from the outside air into the cooling water of the low-temperature cooling water circuit 30 by the low-temperature-side radiator 32 as in the second dehumidification heating mode. This enables smooth switching between the first dehumidification heating mode and the second dehumidification heating mode becomes smooth.

Next, operations in the cooling mode, the first dehumidification heating mode, the second dehumidification heating mode, the third dehumidification heating mode, and the transition mode will be described.

In the cooling mode, the first dehumidification heating mode, the second dehumidification heating mode, the third dehumidification heating mode, and the transition mode, the controller 60 determines the operating states of various controllers connected to the controller 60 (i.e., control signals output to various controllers) based on the target outlet temperature TAO, the detection signals of the sensor group, and the like.

(1) Cooling Mode

In the cooling mode, the controller 60 operates the compressor 11 and the high-temperature-side pump 21. In the cooling mode, the controller 60 opens the heater core passage open/close valve 25 and opens the radiator passage open/close valve 26.

Thus, in the refrigeration cycle device 10 in the cooling mode, the refrigerant flows as indicated by the broken line arrow in FIG. 1, and the state of the refrigerant circulating in the cycle is changed as follows.

That is, a high-pressure refrigerant discharged from the compressor 11 flows into the condenser 12. The refrigerant flowing into the condenser 12 radiates heat to the cooling water of the high-temperature cooling water circuit 20. Thus, the refrigerant is cooled and condensed by the condenser 12.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled.

The refrigerant flowing out of the air-side evaporator 14 flows to the suction side of the compressor 11 and is again compressed by the compressor 11.

As described above, in the cooling mode, the low-pressure refrigerant is caused to absorb heat from the air by the air-side evaporator 14, and the cooled air can be blown out into the cabin. It is thereby possible to realize cooling in the cabin.

In the high-temperature cooling water circuit 20 in the cooling mode, as indicated by the broken line arrow in FIG. 1, the cooling water of the high-temperature cooling water circuit 20 circulates to the high-temperature-side radiator 23 and is radiated from the cooling water to the outside air by the high-temperature-side radiator 23.

At this time, as indicated by the solid line arrow in FIG. 1, the cooling water of the high-temperature cooling water circuit 20 also circulates to the heater core 22, and the amount of heat radiation from the cooling water to the air in the heater core 22 is regulated by the air-mix door 54.

The control signal to be output to the servomotor of the air-mix door 54 is determined so that the air conditioning air regulated in temperature by the air-mix door 54 becomes the target outlet temperature TAO. Specifically, the opening of the air-mix door 54 is determined based on the target outlet temperature TAO, the temperature TE of the air-side evaporator 14, the temperature THin of the cooling water flowing into the heater core 22, and the like.

When it is necessary to cool the battery 33 in the cooling mode, the controller 60 opens the second expansion valve 16 at a throttle opening and controls the low-temperature-side pump 31 and the three-way valve 36 so that the cooling water of the low-temperature cooling water circuit 30 flows in the battery 33.

Thus, in the refrigeration cycle device 10, as indicated by the solid line arrow in FIG. 1, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. In the low-temperature cooling water circuit 30, as indicated by the broken line arrow in FIG. 1, the cooling water circulates to the battery 33 to cool the battery 33.

At this time, the flow rate of cooling water flowing in the battery 33 is regulated by the three-way valve 36 so that the battery 33 is cooled to a target battery temperature.

The larger the temperature difference obtained by subtracting the actual temperature of the battery 33 from the target battery temperature, the larger the flow rate of the cooling water flowing in the battery 33 is made. The smaller the temperature difference obtained by subtracting the actual temperature of the battery 33 from the target battery temperature, the smaller the flow rate of cooling water flowing in the battery 33 is made.

The smaller the temperature difference obtained by subtracting the temperature of the cooling water flowing into the battery 33 from the target battery temperature, the larger the flow rate of the cooling water flowing in the battery 33 is made. The larger the temperature difference obtained by subtracting the temperature of the cooling water flowing into the battery 33 from the target battery temperature, the smaller the flow rate of the cooling water flowing in the battery 33 is made.

(2) First Dehumidification Heating Mode

In the first dehumidification heating mode, the controller 60 operates the compressor 11 and the high-temperature-side pump 21. In the first dehumidification heating mode, the heater core passage open/close valve 25 is opened, and the radiator passage open/close valve 26 is opened.

In the refrigeration cycle device 10 in the first dehumidification heating mode, the refrigerant flows as indicated by the broken line arrow in FIG. 1, and the state of the refrigerant circulating in the cycle is changed as follows.

That is, the high-pressure refrigerant discharged from the compressor 11 flows into the condenser 12 and exchanges heat with the cooling water of the high-temperature cooling water circuit 20 to dissipate heat. Thus, the cooling water of the high-temperature cooling water circuit 20 is heated.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled and dehumidified.

Then, the refrigerant flowing out of the cooling-water-side evaporator 17 flows to the suction side of the compressor 11 and is compressed again by the compressor 11.

In the high-temperature cooling water circuit 20 in the first dehumidification heating mode, as indicated by the solid line arrow in FIG. 1, the cooling water of the high-temperature cooling water circuit 20 circulates to the heater core 22.

The control signal to be output to the servomotor of the air-mix door 54 is determined so that the air-mix door 54 is located at the two-dot chain position in FIG. 1 to fully open the air passage of the heater core 22, and the total flow rate of the air having passed through the air-side evaporator 14 passes through the heater core 22.

Thereby, the heater core 22 radiates heat from the cooling water of the high-temperature cooling water circuit 20 to the air blown into the cabin. Therefore, the air cooled and dehumidified by the air-side evaporator 14 is heated by the heater core 22 and blown out into the cabin.

At the same time, in the high-temperature cooling water circuit 20, as indicated by the broken line arrow in FIG. 1, the cooling water circulates to the high-temperature-side radiator 23 and is radiated from the cooling water to the outside air by the high-temperature-side radiator 23.

Thus, in the first dehumidification heating mode, the heat of the high-pressure refrigerant discharged from the compressor 11 is radiated to the cooling water of the high-temperature cooling water circuit 20 by the condenser 12, the heat of the cooling water of the high-temperature cooling water circuit 20 is radiated by the air in the heater core 22, and the air heated by the heater core 22 can be blown out into the cabin.

In the heater core 22, air cooled and dehumidified by an air-side evaporator 14 is heated. As a result, dehumidification heating in the cabin can be realized.

In the first dehumidification heating mode, the mode is performed with the target outlet temperature TAO in a relatively low temperature region, so that the blowing air temperature of the heater core 22 may be relatively low. Therefore, the amount of heat of the cooling water of the high-temperature cooling water circuit 20 becomes excess to the amount of heat required by the heater core 22.

The excess heat of the cooling water of the high-temperature cooling water circuit 20 is radiated to the outside air by the high-temperature-side radiator 23.

In the first dehumidification heating mode, the flow rate of the cooling water of the high-temperature cooling water circuit 20 flowing in the high-temperature-side radiator 23 may be a flow rate sufficient to radiate the excess heat of the cooling water of the high-temperature cooling water circuit 20 to the outside air.

Thus, in the first dehumidification heating mode, the opening is set so that the excess heat of the cooling water of the high-temperature cooling water circuit 20 can be radiated to the outside air by the high-temperature-side radiator 23.

Therefore, in the first dehumidification heating mode, the opening of the heater core passage open/close valve 25 is made larger than the opening of the radiator passage open/close valve 26. Thus, the flow rate of the cooling water of the high-temperature cooling water circuit 20 flowing in the heater core 22 becomes larger than the flow rate of the cooling water of the high-temperature cooling water circuit 20 flowing in the high-temperature-side radiator 23.

In the first dehumidification heating mode, the time average opening of the heater core passage open/close valve 25 may be set larger than the time average opening of the radiator passage open/close valve 26.

The heater core passage open/close valve 25 and the radiator passage open/close valve 26 are intermittently opened and closed, and the ratio of the valve opening time of the heater core passage open/close valve 25 is made larger than the ratio of the valve opening time of the radiator passage open/close valve 26, so that the time average opening of the heater core passage open/close valve 25 may be made larger than the time average opening of the radiator passage open/close valve 26.

For example, the opening ratio between the heater core passage open/close valve 25 and the radiator passage open/close valve 26 can be determined using the relationship that a heat absorption amount Pa of air per unit time in the heater core 22 and a heat radiation amount Pw of cooling water per unit time in the heater core 22 are the same. The reason for this will be described below.

The heat absorption amount Pa of the air per unit time in the heater core 22, which is required for heating the air to the target outlet temperature TAO in the heater core 22, can be calculated based on the specific heat and density of the air flowing in the heater core 22, the temperature of the air flowing in the heater core 22, the flow rate of the air flowing in the heater core 22, and the target outlet temperature TAO.

In the first dehumidification heating mode, since the air-mix door 54 fully opens the air passage of the heater core 22, the flow rate of the air flowing in the heater core 22 is the same as the amount of air blown by the indoor blower 53. The amount of air blown by the indoor blower 53 can be calculated based on the rotational speed of the indoor blower 53 or the applied voltage.

The temperature of the air flowing into the heater core 22 can be regarded as the same as the temperature TE of the air-side evaporator 14 detected by the evaporator temperature sensor 65.

On the other hand, the heat radiation amount Pw of the cooling water per unit time in the heater core 22 which is required for heating the air to the target outlet temperature TAO in the heater core 22, can be calculated based on the specific heat and density of the cooling water flowing in the heater core 22, the flow rate of the cooling water flowing in the heater core 22, the temperature THin of the cooling water flowing in the heater core 22, and the target outlet temperature TAO.

The flow rate of the cooling water flowing in the heater core 22 can be calculated based on the discharge flow rate of the high-temperature-side pump 21 and the opening ratio between the heater core passage open/close valve 25 to the radiator passage open/close valve 26.

From the relationship that the heat absorption amount Pa of the air per unit time in the heater core 22 is the same as the heat radiation amount Pw of the cooling water per unit time in the heater core 22, the flow rate of the cooling water required to flow in the heater core 22 can be calculated, and consequently, the opening ratio between the heater core passage open/close valve 25 and the radiator passage open/close valve 26 can be calculated.

When it is necessary to cool the battery 33 in the first dehumidification heating mode, the controller 60 opens the second expansion valve 16 at a throttle opening and controls the low-temperature-side pump 31 and the three-way valve 36 so that the cooling water of the low-temperature cooling water circuit 30 flows in the battery 33.

Thus, in the refrigeration cycle device 10, as indicated by the solid line arrow in FIG. 1, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. In the low-temperature cooling water circuit 30, as indicated by the broken line arrow in FIG. 1, the cooling water circulates to the battery 33 to cool the battery 33.

At this time, the flow rate of cooling water flowing in the battery 33 is preferably regulated by the three-way valve 36 so that the battery 33 is cooled to a target battery temperature. The flow rate of the cooling water flowing in the battery 33 is regulated in the same manner as in the cooling mode.

(3) Second Dehumidification Heating Mode

In the second dehumidification heating mode, the controller 60 operates the compressor 11, the high-temperature-side pump 21, and the low-temperature-side pump 31. In the second dehumidification heating mode, the controller 60 opens the second expansion valve 16 at a throttle opening. In the second dehumidification heating mode, the controller 60 opens the heater core passage open/close valve 25 and closes the radiator passage open/close valve 26. In the second dehumidification heating mode, the controller 60 controls the three-way valve 36 so that the cooling water of the low-temperature cooling water circuit 30 flows in the low-temperature-side radiator 32.

In the refrigeration cycle device 10 in the second dehumidification heating mode, the refrigerant flows as indicated by the broken line arrow and the solid line arrow in FIG. 1, and the state of the refrigerant circulating in the cycle is changed as follows.

That is, in the refrigeration cycle device 10, as indicated by the broken line arrow in FIG. 1, the high-pressure refrigerant discharged from the compressor 11 flows into the condenser 12 and exchanges heat with the cooling water of the high-temperature cooling water circuit 20 to radiate heat. Thus, the cooling water of the high-temperature cooling water circuit 20 is heated.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled and dehumidified.

Then, the refrigerant flowing out of the cooling-water-side evaporator 17 flows to the suction side of the compressor 11 and is compressed again by the compressor 11.

At the same time, in the refrigeration cycle device 10, as indicated by the solid line arrow in FIG. 1, the refrigerant flowing out of the condenser 12 flows into the second expansion valve 16 and is decompressed and expanded by the second expansion valve until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled.

In the high-temperature cooling water circuit 20 in the second dehumidification heating mode, as indicated by the solid line arrow in FIG. 1, the cooling water of the high-temperature cooling water circuit 20 circulates to the heater core 22.

The control signal to be output to the servomotor of the air-mix door 54 is determined so that the air-mix door 54 is located at the two-dot chain position in FIG. 1 to fully open the air passage of the heater core 22, and the total flow rate of the blow air having passed through the air-side evaporator 14 passes through the heater core 22.

Thereby, the heater core 22 radiates heat from the cooling water of the high-temperature cooling water circuit 20 to the air blown into the cabin. Therefore, the air cooled and dehumidified by the air-side evaporator 14 is heated by the heater core 22 and blown out into the cabin.

At this time, with the radiator passage open/close valve 26 being closed, the cooling water of the high-temperature cooling water circuit 20 does not circulate to the high-temperature-side radiator 23. Therefore, heat is not radiated from the cooling water to the outside air by the high-temperature-side radiator 23.

In the low-temperature cooling water circuit 30 in the second dehumidification heating mode, as indicated by the solid line arrow in FIG. 1, the cooling water of the low-temperature cooling water circuit 30 circulates to the low-temperature-side radiator 32, and heat is absorbed from outside air into the cooling water of the low-temperature cooling water circuit 30 by the low-temperature-side radiator 32.

Thus, in the second dehumidification heating mode, the heat of the high-pressure refrigerant discharged from the compressor 11 is radiated to the cooling water of the high-temperature cooling water circuit 20 by the condenser 12, the heat of the cooling water of the high-temperature cooling water circuit 20 is radiated by the air in the heater core 22, and the air heated by the heater core 22 can be blown out into the cabin.

In the heater core 22, air cooled and dehumidified by an air-side evaporator 14 is heated. As a result, dehumidification heating in the cabin can be realized.

In the second dehumidification heating mode, the target outlet temperature TAO is performed in a higher temperature region than in the first dehumidification heating mode, so that the blowout air temperature of the heater core 22 needs to be set higher than in the first dehumidification heating mode.

Since heat is absorbed from the outside air into the cooling water of the low-temperature cooling water circuit 30 by the low-temperature-side radiator 32, the amount of heat available in the heater core 22 can be increased as compared to that in the first dehumidification heating mode, and the blowout air temperature of the heater core 22 can be increased.

In the second dehumidification heating mode, the flow rate of the cooling water in the low-temperature cooling water circuit 30 flowing in the low-temperature-side radiator 32 may be such that heat required for heating the air in the heater core 22 to the target outlet temperature TAO can be absorbed by the low-temperature-side radiator 32.

Accordingly, the three-way valve 36 is controlled so that the flow rate of the cooling water of the low-temperature cooling water circuit 30 flowing in the low-temperature-side radiator 32 increases as the temperature difference obtained by subtracting the temperature (i.e., the temperature TE of the air-side evaporator 14) of the air flowing into the heater core 22 from the target outlet temperature TAO increases.

When it is necessary to cool the battery 33 in the second dehumidification heating mode, the controller 60 opens the second expansion valve 16 at a throttle opening and controls the three-way valve 36 so that the cooling water of the low-temperature cooling water circuit 30 flows in the battery 33.

Thus, in the refrigeration cycle device 10, as indicated by the solid line arrow in FIG. 1, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. In the low-temperature cooling water circuit 30, as indicated by the broken line arrow in FIG. 1, the cooling water circulates to the battery 33 to cool the battery 33.

At this time, the flow rate of cooling water flowing in the battery 33 is preferably regulated by the three-way valve 36 so that the battery 33 is cooled to a target battery temperature. The flow rate of the cooling water flowing in the battery 33 is regulated in the same manner as in the cooling mode.

(4) Third Dehumidification Heating Mode

In the third dehumidification heating mode, the target outlet temperature TAO is performed in a higher temperature region than in the second dehumidification heating mode, so that the blowout air temperature of the heater core 22 needs to be set higher than in the second dehumidification heating mode.

In the third dehumidification heating mode, the heat absorption amount from the outside air in the low-temperature-side radiator 32 is increased as compared to that in the second dehumidification heating mode. Specifically, the three-way valve 36 is controlled so that the flow rate of the cooling water flowing in the low-temperature-side radiator 32 becomes maximum with respect to the second dehumidification heating mode.

Thus, the amount of heat available in the heater core 22 can be increased as compared to that in the second dehumidification heating mode, and the blowout air temperature of the heater core 22 can be increased.

When it is necessary to cool the battery 33 in the third dehumidification heating mode, the controller 60 opens the second expansion valve 16 at a throttle opening and controls the three-way valve 36 so that the cooling water of the low-temperature cooling water circuit 30 flows in the battery 33.

Thus, in the refrigeration cycle device 10, as indicated by the solid line arrow in FIG. 1, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. In the low-temperature cooling water circuit 30, as indicated by the broken line arrow in FIG. 1, the cooling water circulates to the battery 33 to cool the battery 33.

At this time, the flow rate of cooling water flowing in the battery 33 is preferably regulated by the three-way valve 36 so that the battery 33 is cooled to a target battery temperature. The flow rate of the cooling water flowing in the battery 33 is regulated in the same manner as in the cooling mode.

(5) Transition Mode

In the transition mode, the controller 60 operates the compressor 11, the high-temperature-side pump 21, and the low-temperature-side pump 31. In the transition mode, the controller 60 opens the second expansion valve 16 at a throttle opening. In the transition mode, the heater core passage open/close valve 25 is opened, and the radiator passage open/close valve 26 is opened. In the transition mode, the controller 60 controls the three-way valve 36 so that the cooling water of the low-temperature cooling water circuit 30 flows in the low-temperature-side radiator 32.

In the refrigeration cycle device 10 in the transition mode, the refrigerant flows as indicated by the broken line arrow and the solid line arrow in FIG. 1, and the state of the refrigerant circulating in the cycle is changed as follows.

That is, in the refrigeration cycle device 10, as indicated by the broken line arrow in FIG. 1, the high-pressure refrigerant discharged from the compressor 11 flows into the condenser 12 and exchanges heat with the cooling water of the high-temperature cooling water circuit 20 to radiate heat. Thus, the cooling water of the high-temperature cooling water circuit 20 is heated.

The refrigerant flowing out of the condenser 12 flows into the first expansion valve 13 and is decompressed and expanded by the first expansion valve 13 until becoming a low-pressure refrigerant. The low-pressure refrigerant decompressed by the first expansion valve 13 flows into the air-side evaporator 14 and absorbs the heat from the air blown into the cabin to evaporate. Thus, the air blown into the cabin is cooled and dehumidified.

Then, the refrigerant flowing out of the cooling-water-side evaporator 17 flows to the suction side of the compressor 11 and is compressed again by the compressor 11.

At the same time, in the refrigeration cycle device 10, as indicated by the solid line arrow in FIG. 1, the refrigerant flowing out of the condenser 12 flows into the second expansion valve 16 and is decompressed and expanded by the second expansion valve until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled.

In the high-temperature cooling water circuit 20 in the first dehumidification heating mode, as indicated by the solid line arrow in FIG. 1, the cooling water of the high-temperature cooling water circuit 20 circulates to the heater core 22.

The control signal to be output to the servomotor of the air-mix door 54 is determined so that the air-mix door 54 is located at the two-dot chain position in FIG. 1 to fully open the air passage of the heater core 22, and the total flow rate of the air having passed through the air-side evaporator 14 passes through the heater core 22.

Thereby, the heater core 22 radiates heat from the cooling water of the high-temperature cooling water circuit 20 to the air blown into the cabin. Therefore, the air cooled and dehumidified by the air-side evaporator 14 is heated by the heater core 22 and blown out into the cabin.

In the high-temperature cooling water circuit 20 in the transition mode, as indicated by the broken line arrow in FIG. 1, the cooling water of the high-temperature cooling water circuit 20 circulates to the high-temperature-side radiator 23 and is radiated from the cooling water to the outside air by the high-temperature-side radiator 23.

In the low-temperature cooling water circuit 30 in the transition mode, as indicated by the solid line arrow in FIG. 1, the cooling water of the low-temperature cooling water circuit 30 circulates to the low-temperature-side radiator 32, and heat is absorbed from outside air into the cooling water of the low-temperature cooling water circuit 30 by the low-temperature-side radiator 32.

Thus, in the transition mode, the heat of the high-pressure refrigerant discharged from the compressor 11 is radiated to the cooling water of the high-temperature cooling water circuit 20 by the condenser 12, the heat of the cooling water of the high-temperature cooling water circuit 20 is radiated by the air in the heater core 22, and the air heated by the heater core 22 can be blown out into the cabin.

In the heater core 22, air cooled and dehumidified by an air-side evaporator 14 is heated. As a result, dehumidification heating in the cabin can be realized.

Since heat is absorbed from the outside air into the cooling water of the low-temperature cooling water circuit 30 by the low-temperature-side radiator 32, the amount of heat available in the heater core 22 can be increased as in the second dehumidification heating mode, and the blowout air temperature of the heater core 22 can be increased. The flow rate of the cooling water of the low-temperature cooling water circuit 30 flowing in the low-temperature-side radiator 32 is regulated as in the second dehumidification heating mode. That is, the three-way valve 36 is controlled as in the second dehumidification heating mode.

As in the second dehumidification heating mode, the excess heat of the cooling water of the high-temperature cooling water circuit 20 is radiated to the outside air by the high-temperature-side radiator 23. The flow rate of the cooling water of the high-temperature cooling water circuit 20 flowing in the high-temperature-side radiator 23 is regulated as in the first dehumidification heating mode. That is, the openings of the heater core passage open/close valve 25 and the radiator passage open/close valve 26 are determined as in the first dehumidification heating mode.

When it is necessary to cool the battery 33 in the transition mode, the controller 60 opens the second expansion valve 16 at a throttle opening and controls the three-way valve 36 so that the cooling water of the low-temperature cooling water circuit 30 flows in the battery 33.

Thus, in the refrigeration cycle device 10, as indicated by the solid line arrow in FIG. 1, the refrigerant flowing out of the condenser 12 flows into the second expansion valve 16 and is decompressed and expanded by the second expansion valve 16 until becoming a low-pressure refrigerant. The low-pressure refrigerant decompressed by the second expansion valve 16 flows into the cooling-water-side evaporator 17 and absorbs heat from the cooling water of the low-temperature cooling water circuit 30 to evaporate. Thus, the cooling water of the low-temperature cooling water circuit 30 is cooled. In the low-temperature cooling water circuit 30, as indicated by the broken line arrow in FIG. 1, the cooling water circulates to the battery 33 to cool the battery 33.

At this time, the flow rate of cooling water flowing in the battery 33 is preferably regulated by the three-way valve 36 so that the battery 33 is cooled to a target battery temperature. The flow rate of the cooling water flowing in the battery 33 is regulated in the same manner as in the cooling mode.

In the transition mode, heat is radiated from the cooling water of the high-temperature cooling water circuit 20 to the outside air by the high-temperature-side radiator 23 as in the first dehumidification heating mode, and heat is absorbed from the outside air into the cooling water of the low-temperature cooling water circuit 30 by the low-temperature-side radiator 32 as in the second dehumidification heating mode.

Therefore, at the time of switching between the first dehumidification heating mode and the second dehumidification heating mode, the switching between the first dehumidification heating mode and the second dehumidification heating mode is smoothly performed by temporarily executing the transition mode.

In the present embodiment, the controller 60 controls the heater core passage open/close valve 25 and the radiator passage open/close valve 26 so that the flow ratio is obtained at which, of the heat radiated from the refrigerant in the condenser 12 to the cooling water in the high-temperature cooling water circuit 20, the excess heat with respect to the heat required for heating the air blown into the cabin by the heater core 22 to the target outlet temperature TAO is radiated to the air outside the cabin by the high-temperature-side radiator 23.

"of the heat radiated from the refrigerant in the condenser 12 to the cooling water in the high-temperature cooling water circuit 20, the excess heat with respect to the heat required for heating the air blown into the cabin by the heater core 22 to the target outlet temperature TAO" means the difference obtained by subtracting the amount of heat, required for heating the air blown into the cabin to the target outlet temperature TAO by the heater core 22, from the amount of heat radiated from the refrigerant by the condenser 12 to the cooling water of the high-temperature cooling water circuit 20.

Thus, the heating medium can be allowed to flow in the heater core 22 so that heat required for heating the air blown into the cabin by the heater core 22 to the target outlet temperature TAO is distributed to the heater core 22. Therefore, the air blown into the cabin can be appropriately heated by the heater core 22.

In the present embodiment, when the cooling water of the high-temperature cooling water circuit 20 is allowed to flow in both the heater core 22 and the high-temperature-side radiator 23, the controller 60 controls the heater core passage open/close valve 25 and the radiator passage open/close valve 26 so that the time average flow rate of the cooling water of the high-temperature cooling water circuit 20 in the heater core 22 is larger than the time average flow rate of the cooling water of the high-temperature cooling water circuit 20 in the high-temperature-side radiator 23. Thus, insufficient air heating capacity in the heater core 22 can be restricted reliably.

In the present embodiment, the radiator passage open/close valve 26 is disposed between the condenser 12 and the high-temperature-side radiator 23 in the flow of the cooling water of the high-temperature cooling water circuit 20 and regulates the flow rate of the cooling water of the high-temperature cooling water circuit 20 flowing into the high-temperature-side radiator 23. Thus, the excess heat can be reliably radiated to the air outside the cabin by the high-temperature-side radiator 23.

In the present embodiment, the heater core 22 and the high-temperature-side radiator 23 are disposed in parallel with each other in the flow of cooling water in the high-temperature cooling water circuit 20. The heater core passage open/close valve 25 is disposed between the high-temperature-side branch 20d and the heater core 22 in the flow of cooling water of the high-temperature cooling water circuit 20 and regulates the flow rate of cooling water of the high-temperature cooling water circuit 20 flowing into the heater core 22. Thus, the excess heat can be more reliably radiated to the air outside the cabin by the high-temperature-side radiator 23.

The refrigeration cycle device 10 of the present embodiment includes the cooling-water-side evaporator 17. The cooling-water-side evaporator 17 exchanges heat between the refrigerant decompressed by the second expansion valve 16 and the cooling water of the low-temperature cooling water circuit 30 to evaporate the refrigerant and to cool the cooling water of the low-temperature cooling water circuit 30. Thus, in the refrigeration cycle device 10 that exhibits the effects described above, the cooling water of the low-temperature cooling water circuit 30 can be cooled.

In the present embodiment, the low-temperature-side radiator 32 is a heat absorber that exchanging heat between the cooling water of the low-temperature cooling water circuit 30 and the outside air to absorb heat from the outside air into the cooling water of the low-temperature cooling water circuit 30. As a result, in the refrigeration cycle device 10 that exhibits the effects described above, the air heating capacity in the heater core 22 can be enhanced by absorbing heat from the outside air.

In the present embodiment, the controller 60 executes the transition mode at the time of switching between the first dehumidification heating mode and the second dehumidification heating mode.

It is thereby possible to smoothly switch between the first dehumidification heating mode for radiating heat to the outside air by the high-temperature-side radiator 23 and the second dehumidification heating mode for absorbing heat from the outside air by the low-temperature-side radiator 32.

In the present embodiment, the controller 60 controls the operation of the three-way valve 36 so that the flow ratio between the flow rate of cooling water of the low-temperature cooling water circuit 30 flowing in the low-temperature-side radiator 32 and the flow rate of cooling water of the low-temperature cooling water circuit 30 for cooling the battery 33 becomes a flow ratio at which the battery 33 is cooled to the target battery temperature.

This allows the cooling water of the low-temperature cooling water circuit 30 to flow in the battery 33 so that the battery 33 reaches the target battery temperature. Therefore, the battery 33 can be appropriately cooled while the air blown into the cabin is heated.

In the present embodiment, the battery 33 is cooled by the cooling water of the low-temperature cooling water circuit 30. Thus, the battery 33 can be cooled efficiently.

In the present embodiment, the charger 34 is cooled by the cooling water of the low-temperature cooling water circuit 30. Thus, the charger 34 can be cooled efficiently.

In the present embodiment, the air-side evaporator 14 exchanges heat between the refrigerant decompressed by the first expansion valve 13 and the air blown into the cabin to cool the air blown into the cabin. As a result, in the refrigeration cycle device capable of performing dehumidification heating in the cabin, it is possible to achieve the effects described above.

Second Embodiment

Figure 4:
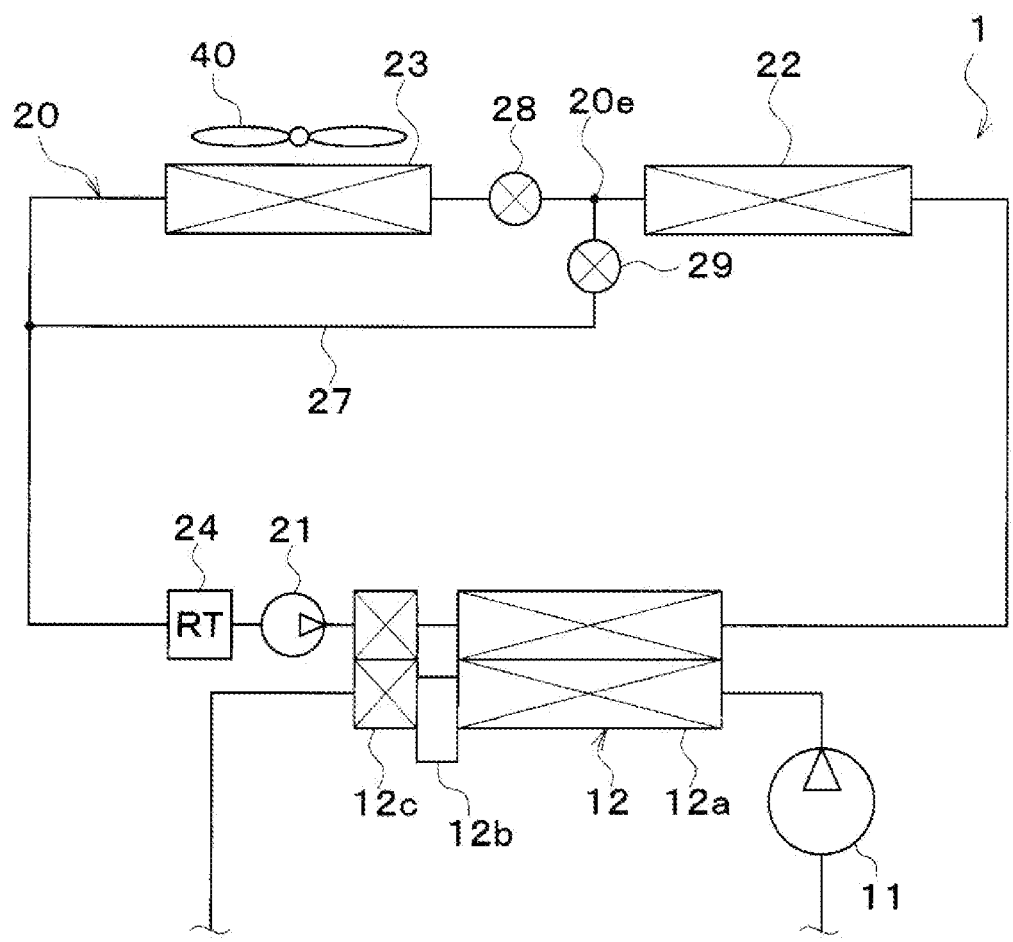
FIG. 4 is a configuration diagram illustrating a part of a refrigeration cycle device according to a second embodiment.

In the above embodiment, the heater core 22 and the high-temperature-side radiator 23 are disposed in parallel with each other in the flow of cooling water of the high-temperature cooling water circuit 20, but in the present embodiment, as illustrated in FIG. 4, the heater core 22 and the high-temperature-side radiator 23 are disposed in series with each other in the flow of cooling water of the high-temperature cooling water circuit 20.

The high-temperature cooling water circuit 20 is provided with a bypass passage 27. The bypass passage 27 is a bypass part in which the cooling water of the high-temperature cooling water circuit 20 flows by bypassing the high-temperature-side radiator 23.

A flow rate regulation valve 28 is disposed in a portion of the cooling water passage of the high-temperature cooling water circuit 20 where the cooling water flows in parallel with the bypass passage 27. The flow rate regulation valve 28 is a solenoid valve that opens and closes the cooling water passage and can arbitrarily regulate the opening of the cooling water passage. The operation of the flow rate regulation valve 28 is controlled by the controller 60.

In the high-temperature cooling water circuit 20, the flow rate regulation valve 28 is disposed between a bypass branch 20e, which is a branch of the bypass passage 27, and the high-temperature-side radiator 23. The flow rate regulation valve 28 is a high-temperature heating medium regulator for regulating the flow ratio between the cooling water flowing in the high-temperature-side radiator 23 and the cooling water flowing in the bypass passage 27. The flow ratio between the cooling water flowing in the high-temperature-side radiator 23 and the cooling water flowing in the bypass passage 27 is a bypass flow ratio. The flow rate regulation valve 28 is a flow rate regulator (i.e., flow rate adjustment mechanism) for regulating the flow rate of the cooling water.

The flow ratio between the cooling water flowing in the heater core 22 and the cooling water flowing in the high-temperature-side radiator 23 is regulated by a flow rate regulation valve 28.

A bypass on-off valve 29 is disposed in the bypass passage 27. The bypass on-off valve 29 is a solenoid valve that opens and closes the bypass passage 27. The operation of the bypass on-off valve 29 is controlled by the controller 60.

The flow ratio between the flow rate of cooling water flowing in the heater core 22 and the flow rate of cooling water flowing in the high-temperature-side radiator 23 can be regulated by regulating the opening of the flow rate regulation valve 28 and the opening of the bypass on-off valve 29.

In the first dehumidification heating mode, the flow rate on the heater core side is made larger than the flow rate on the high-temperature-side radiator side as in the first embodiment.

By closing the flow rate regulation valve 28 and opening the bypass on-off valve 29, it is possible to allow the cooling water to flow in the heater core 22 without allowing the cooling water to flow in the high-temperature-side radiator 23. Therefore, the modes can be switched to the second and third dehumidification modes as in the first embodiment.

In the present embodiment, the heater core 22 and the high-temperature-side radiator 23 are disposed in series with each other in the flow of cooling water in the high-temperature cooling water circuit 20. The heater core 22 is disposed on the upstream side of the cooling water of the high-temperature cooling water circuit 20 from the high-temperature-side radiator 23. In the bypass passage 27, the cooling water of the high-temperature cooling water circuit 20 flowing out of the heater core 22 flows by bypassing the high-temperature-side radiator 23. The bypass on-off valve 29 regulates the flow ratio between the cooling water of the high-temperature cooling water circuit 20 flowing in the high-temperature-side radiator 23 and the cooling water of the high-temperature cooling water circuit 20 flowing in the bypass passage 27, thereby regulating the flow ratio between the cooling water of the high-temperature cooling water circuit 20 flowing in the heater core 22 and the cooling water of the high-temperature cooling water circuit 20 flowing in the high-temperature-side radiator 23.

As a result, the same operations and effects as in the above embodiment can be realized.

Third Embodiment

Figure 5:
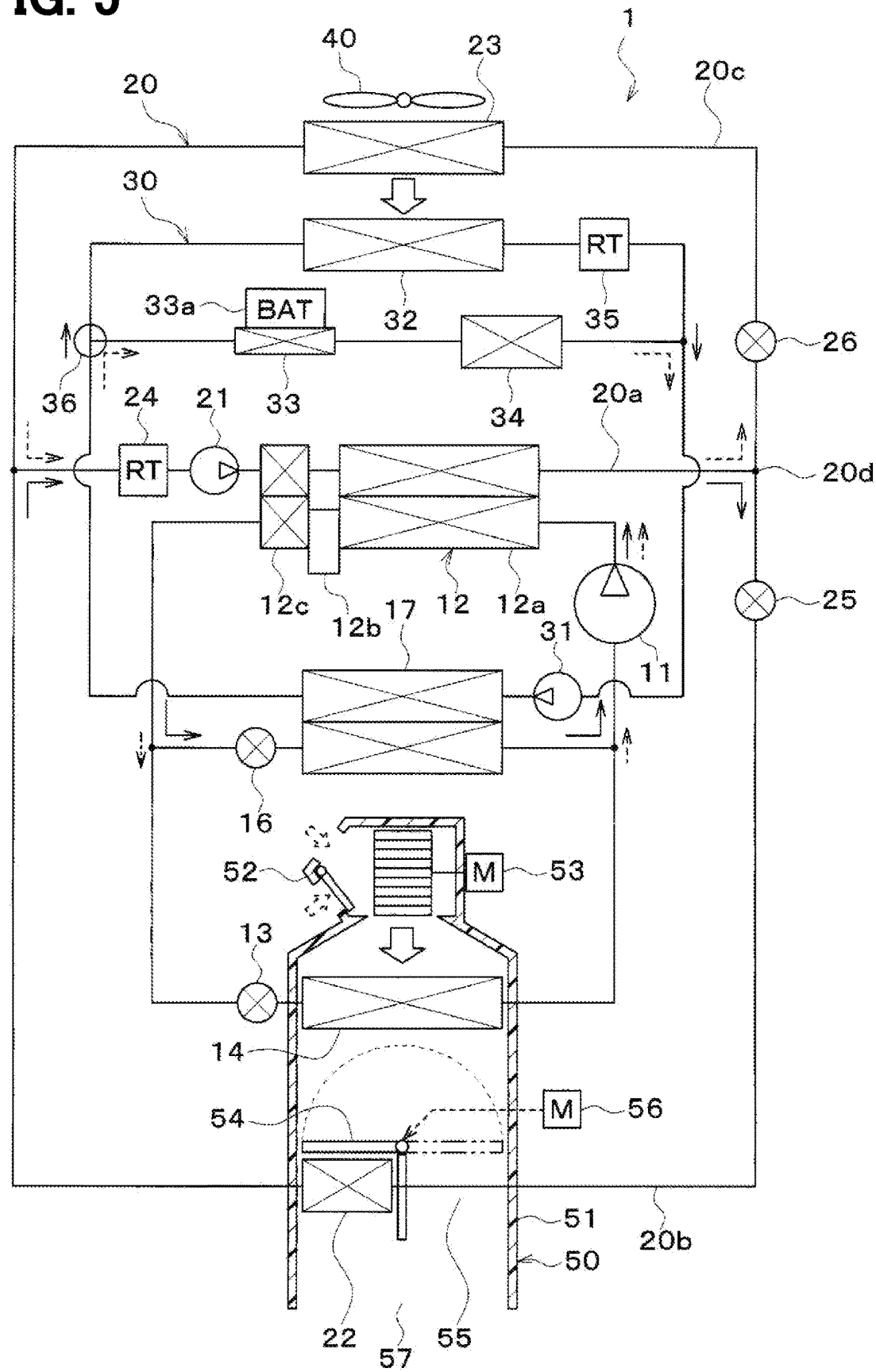
FIG. 5 illustrates an overall configuration diagram of a refrigeration cycle device according to a third embodiment.

In the above embodiment, the constant pressure valve 15 makes the refrigerant pressure of the air-side evaporator 14 higher than the refrigerant pressure of the air-side evaporator 14, but in the present embodiment, as illustrated in FIG. 5, the constant pressure valve 15 is not provided on the outlet side of the cooling-water-side evaporator 17, and hence the refrigerant pressure in the cooling-water-side evaporator 17 becomes the same as the refrigerant pressure in the air-side evaporator 14.

Similarly to the first embodiment, in the present embodiment as well, when the amount of heat absorbed by the air-side evaporator 14 and the cooling-water-side evaporator 17 becomes excess to the amount of heat required by the heater core 22 in the first dehumidification heating mode, the excess heat is radiated to the outside air by the high-temperature-side radiator 23.

The flow ratio between the flow rate of the cooling water flowing in the heater core 22 and the flow rate of the cooling water flowing in the high-temperature-side radiator 23, that is, the opening ratio between the heater core passage open/close valve 25 and the radiator passage open/close valve 26 may be determined as in the first embodiment.

Fourth Embodiment

Figure 6:
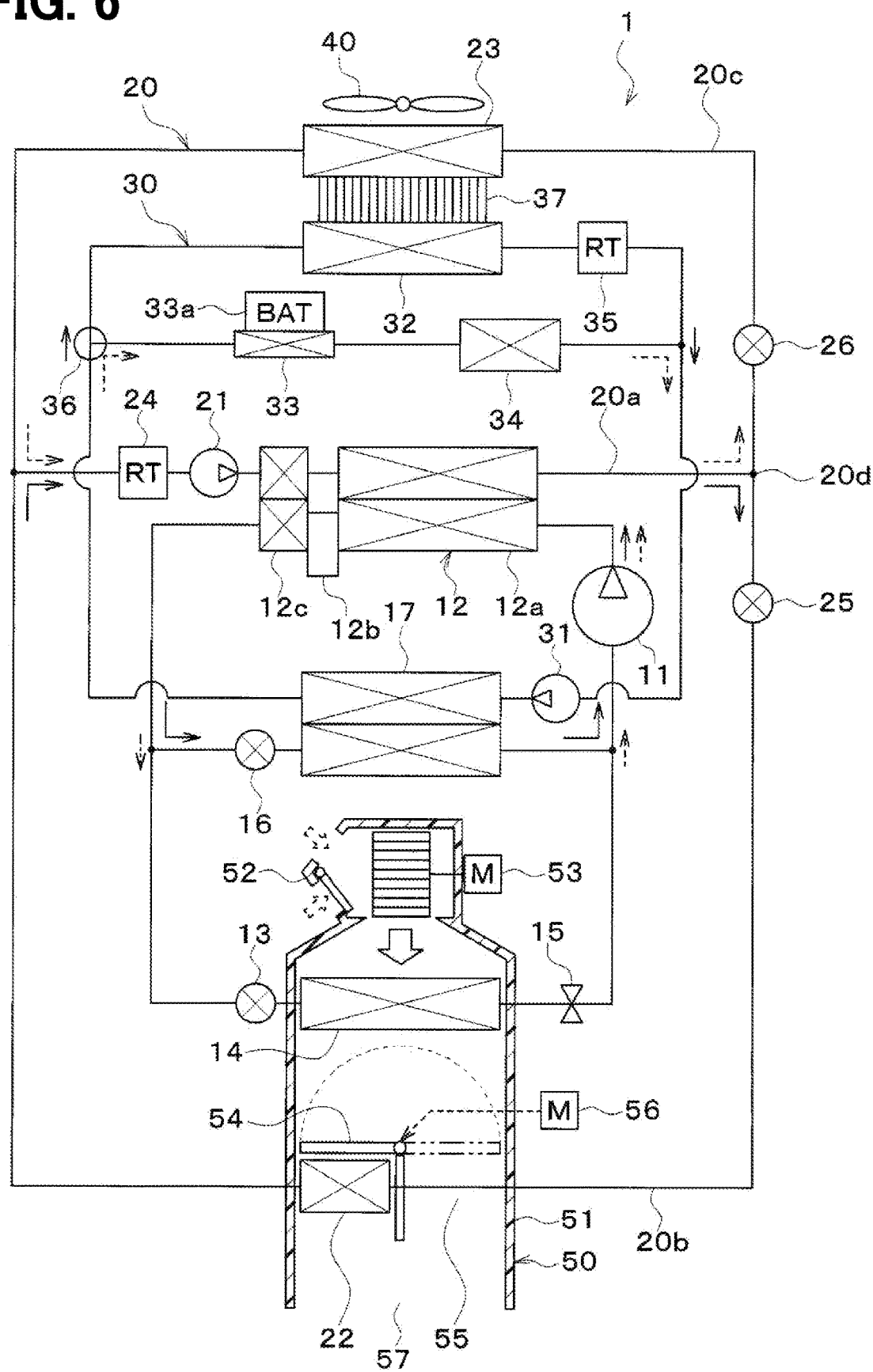
FIG. 6 illustrates an overall configuration diagram of a refrigeration cycle device according to a fourth embodiment.

In the present embodiment, as illustrated in FIG. 6, the high-temperature-side radiator 23 and the low-temperature-side radiator 32 are connected to each other by a common fin 37.

The common fin 37 is a heat exchange promoting member for promoting heat exchange between cooling water and air. The common fin 37 is a metal (e.g., aluminum) member.

The common fin 37 is a coupling part that couples the high-temperature-side radiator 23 and the low-temperature-side radiator 32 with metal to transfer heat from the high-temperature-side radiator 23 to the low-temperature-side radiator 32

This enables defrosting after the second and third dehumidification heating modes. In the second and third dehumidification heating modes, since the cooling water of the low-temperature cooling water circuit 30 is absorbed from the outside air by the low-temperature-side radiator 32, frosting occurs in the low-temperature-side radiator 32 when the temperature of the low-temperature-side radiator 32 falls below zero. Therefore, when the vehicle stops after the execution of the second and third dehumidification heating modes, the heat remaining in the cooling water of the high-temperature cooling water circuit 20 is utilized to defrost the low-temperature-side radiator 32.

That is, since the high-temperature-side radiator 23 and the low-temperature-side radiator 32 are connected to each other by the common fin 37 so as to be heat-transferable, heat of cooling water in the high-temperature cooling water circuit 20 is transferred from the high-temperature-side radiator 23 to the low-temperature-side radiator 32.

Accordingly, the temperature of the low-temperature-side radiator 32 is raised, and the frost adhering to the surface of the low-temperature-side radiator 32 can be melted.

Fifth Embodiment

Figure 7:
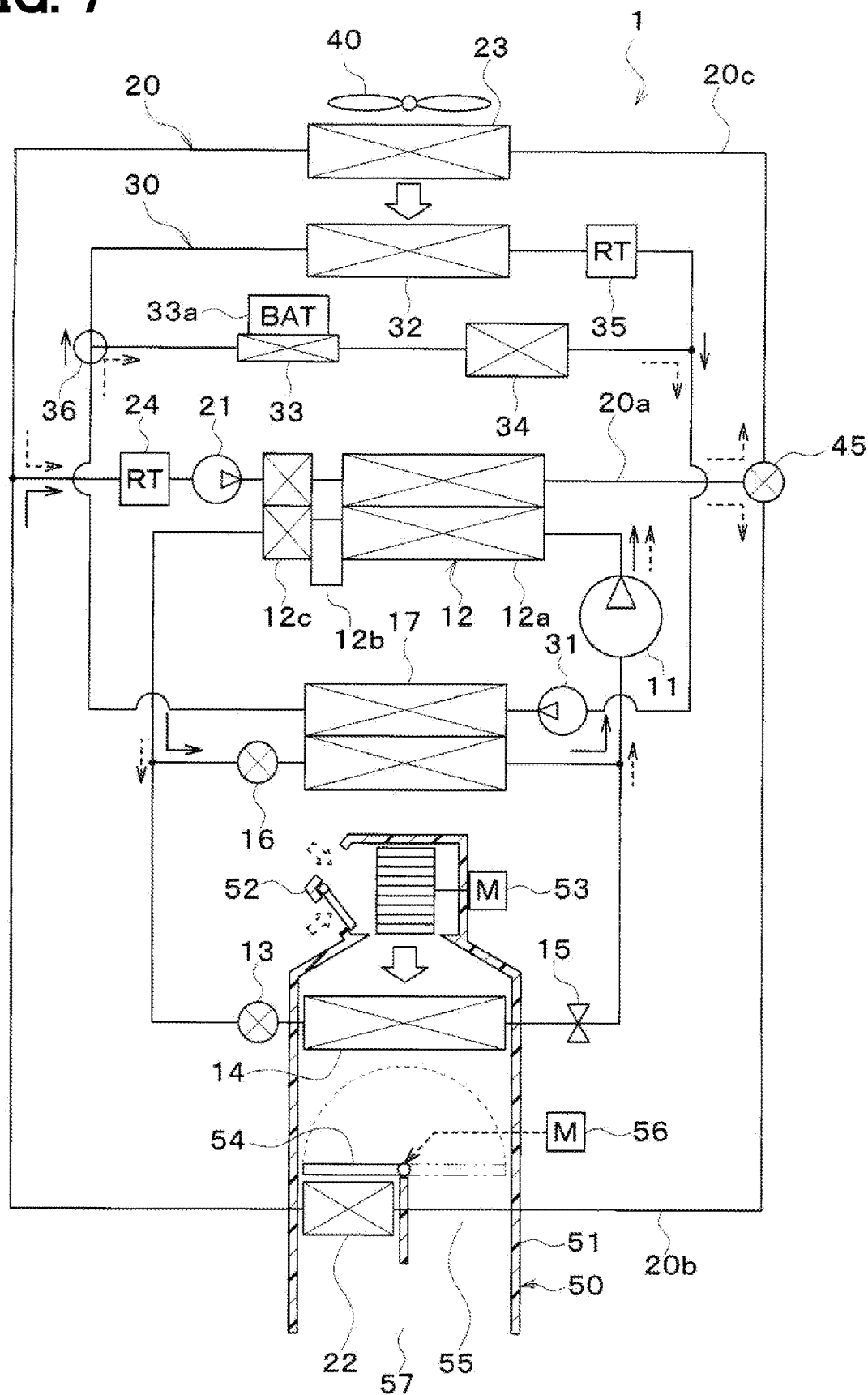
FIG. 7 illustrates an overall configuration diagram of a refrigeration cycle device according to a fifth embodiment.

In the above embodiment, the flow ratio between the cooling water flowing in the heater core 22 and the cooling water flowing in the high-temperature-side radiator 23 is regulated by the heater core passage open/close valve 25 and the radiator passage open/close valve 26, but in the present embodiment, as illustrated in FIG. 7, the flow ratio between the cooling water flowing in the heater core 22 and the cooling water flowing in the high-temperature-side radiator 23 is regulated by a high-temperature-side three-way valve 45.

The high-temperature-side three-way valve 45 is a flow rate regulator (i.e., flow rate adjustment mechanism) for regulating the flow rate of the cooling water. The high-temperature-side three-way valve 45 is disposed at the high-temperature-side branch 20*d* and regulates an opening ratio between the heater core passage 20*b* and the radiator passage 20*c*. Thus, the high-temperature-side three-way valve 45 regulates the flow ratio between the cooling water flowing in the heater core 22 and the cooling water flowing in the high-temperature-side radiator 23. In other words, the high-temperature-side three-way valve 45 regulates a ratio Gw (hereinafter referred to as radiator flow ratio) of the flow rate of cooling water flowing into the high-temperature-side radiator 23 to the flow rate of cooling water heated by the condenser 12. The radiator flow ratio is a radiator-side flow ratio.

Figure 8:
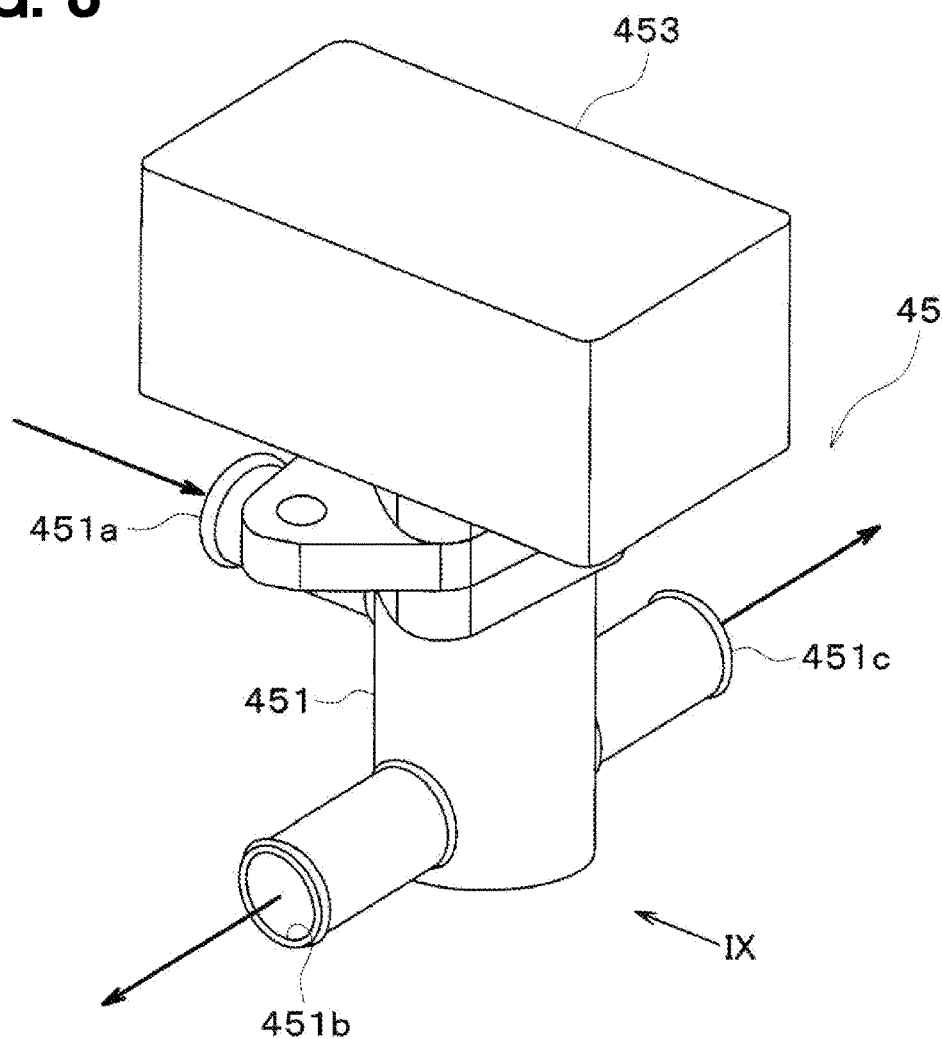
FIG. 8 is a perspective view of a high-temperature-side three-way valve according to the fifth embodiment.
Figure 9:
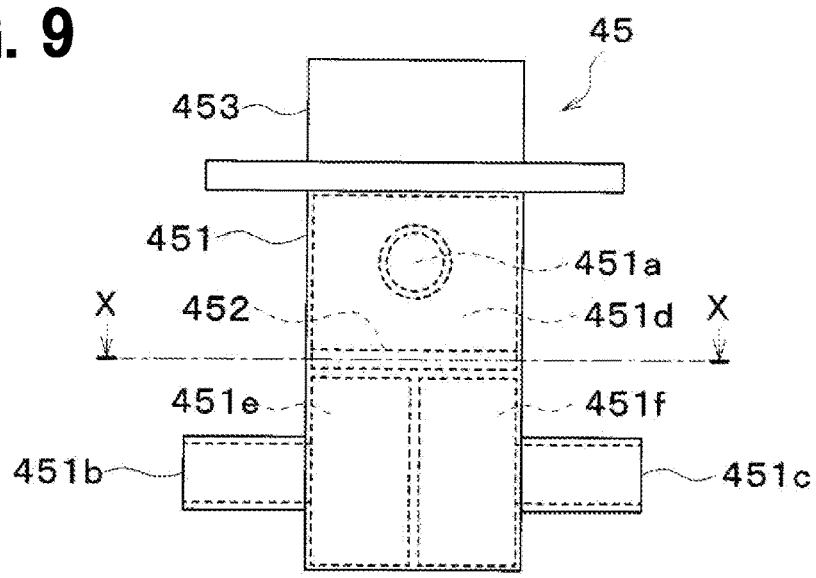
FIG. 9 is a view on arrow IX of FIG. 8.

As illustrated in FIGS. 8 and 9, the high-temperature-side three-way valve 45 includes a housing 451, a valve element 452, and an actuator 453. The housing 451 has a cooling water inlet 451*a*, a heater-core-side outlet 451*b*, and a radiator-side outlet 451*c*.

The cooling water inlet 451*a* is a heating medium inlet. The cooling water inlet 451*a* is connected to the condenser passage 20*a*. The heater-core-side outlet 451*b* is connected to the heater core passage 20*b*. The radiator-side outlet 451*c* is connected to the radiator passage 20*c*.

A cooling water inlet space 451*d*, a heater-core-side space 451*e*, and a radiator-side space 451*f* are formed inside the housing 451. The cooling water inlet space 451*d* is a heating medium inlet space. The cooling water inlet space 451*d* communicates with the cooling water inlet 451*a*. The heater-core-side space 451*e* communicates with a heater-core-side outlet 451*b*. The radiator-side space 451*f* communicates with a radiator-side outlet 451*c*.

The heater-core-side space 451*e* and the radiator-side space 451*f* each communicate with the cooling water inlet space 451*d*. The heater-core-side space 451*e* and the radiator-side space 451*f* are adjacent to each other.

The valve element 452 opens and closes the heater-core-side space 451*e* and the radiator-side space 451*f* to change the states of communication of the heater-core-side space 451*e* and the radiator-side space 451*f* with the cooling water inlet space 451*d*. The valve element 452 regulates the openings of the heater-core-side space 451*e* and the radiator-side space 451*f*, thereby regulating the opening ratio of the heater core passage 20*b* to the radiator passage 20*c*.

The valve element 452 is rotationally operated by the rotational driving force of the actuator 453. The operation of the actuator 453 is controlled by the controller 60.

Figure 10:
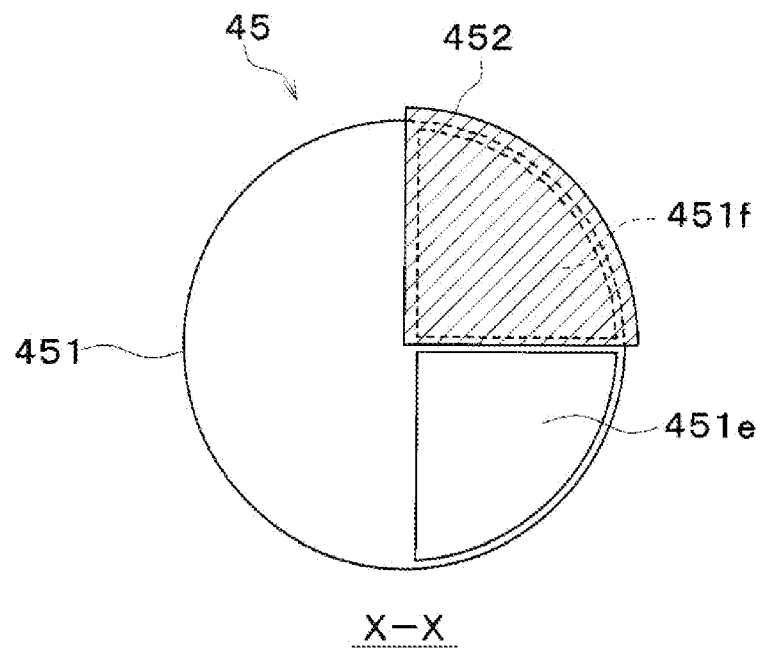
FIG. 10 is a schematic sectional view taken along line X-X of FIG. 9, illustrating an example of the operating state of the high-temperature-side three-way valve.
Figure 11:
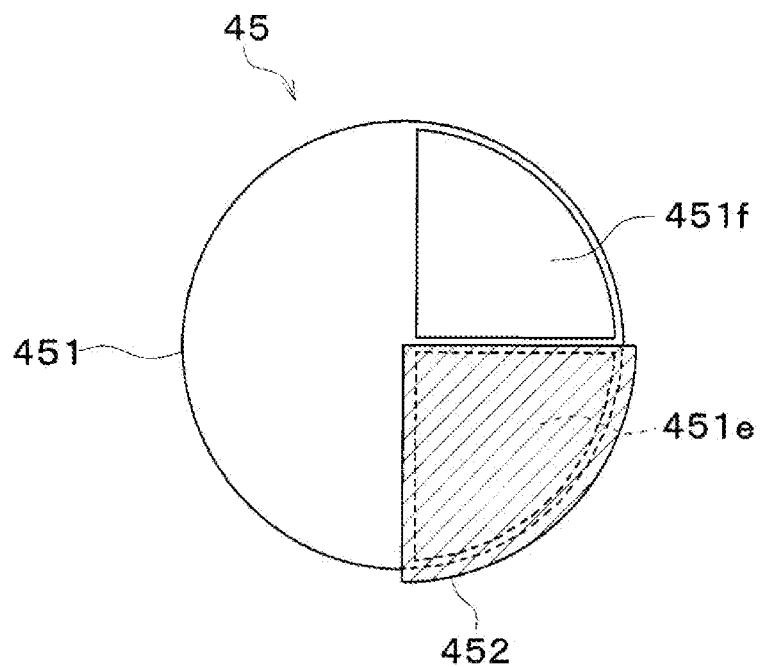
FIG. 11 is a schematic sectional view illustrating an example of the operating state of the high-temperature-side three-way valve.
Figure 12:
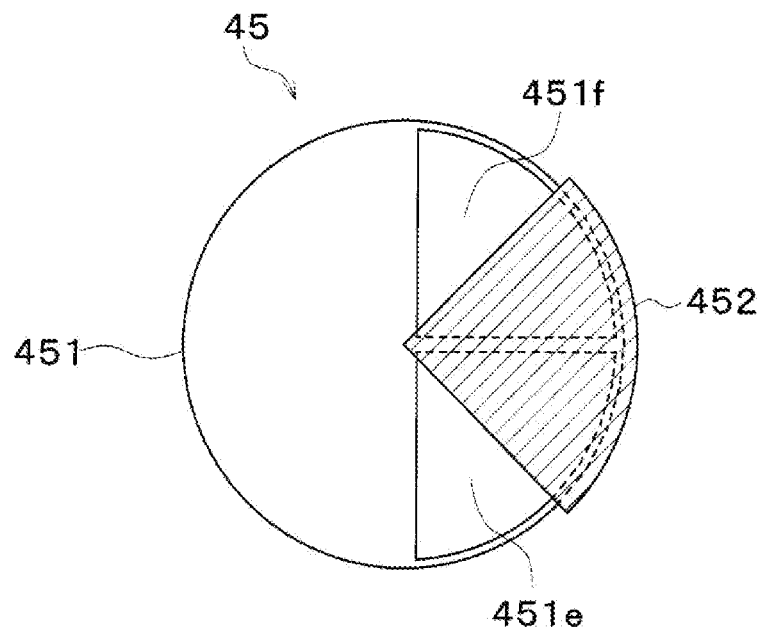
FIG. 12 is a schematic sectional view illustrating an example of the operating state of the high-temperature-side three-way valve.

FIGS. 10 to 12 each illustrates an example of the operating state of the valve element 452. In the example illustrated in FIG. 10, the valve element 452 opens the heater-core-side space 451*e* and closes the radiator-side space 451*f*. In the example illustrated in FIG. 11, the valve element 452 closes the heater-core-side space 451*e* and opens the radiator-side space 451*f*.

In the example illustrated in FIG. 12, the valve element 452 partially opens each of the heater-core-side space 451*e* and the radiator-side space 451*f*.

By operating the valve element 452 at an arbitrary position between the position illustrated in FIG. 10 and the position illustrated in FIG. 11, the opening ratio between the heater-core-side space 451*e* and the radiator-side space 451*f* can be regulated arbitrarily. Thus, the high-temperature-side three-way valve 45 can arbitrarily regulate the flow ratio between the cooling water flowing in the heater core 22 and the cooling water flowing in the high-temperature-side radiator 23. In other words, the high-temperature-side three-way valve 45 can arbitrarily regulate the radiator flow ratio Gw.

The minimum resolution of the radiator flow ratio in the high-temperature-side three-way valve 45 will be described with reference to FIG. 13. The minimum resolution of the radiator flow ratio in the high-temperature-side three-way valve 45 is the minimum variation of the radiator flow ratio when the high-temperature-side three-way valve 45 regulates the radiator flow ratio. In other words, the minimum resolution of the radiator flow ratio in the high-temperature-side three-way valve 45 is the minimum regulation range of the radiator flow ratio in the high-temperature-side three-way valve 45. That is, this means that the smaller the minimum resolution of the high-temperature-side three-way valve 45, the more finely the radiator flow ratio can be regulated.

Figure 13:
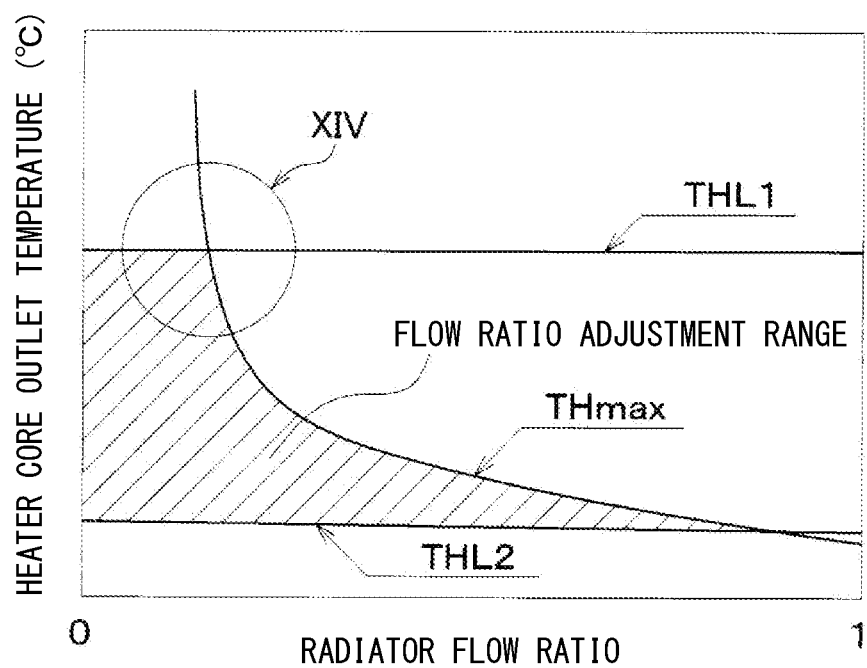
FIG. 13 is a graph illustrating a relationship between a radiator flow ratio and a heater core outlet temperature in the fifth embodiment.

FIG. 13 illustrates the relationship between the radiator flow ratio Gw and a temperature TH (hereinafter referred to as heater core outlet temperature) of the air blown out from the heater core 22.

The relationship between the radiator flow ratio Gw and the heater core outlet temperature TH illustrated in FIG. 13 is a result of measuring the heater core outlet temperature TH when the high-temperature-side three-way valve 45 is controlled so that the radiator flow ratio decreases from 1 to 0 under conditions (1) to (3) below:

(1) When the outside air temperature Tam is 0° C., and the cabin inside temperature Tr is 25° C., the suction mode of the cabin inside air conditioning unit 50 is set to an inside air introduction mode, and the amount of air blown by the indoor blower 53 in the cabin inside air conditioning unit 50 is set to 200 m³/h. The inside air introduction mode is an operation mode in which the inside/outside air switching box 52 introduces inside air into the air passage in the air conditioning casing 51.

(2) The compressor 11 is controlled so that the heat absorption amount (i.e., dehumidification capacity or battery cooling capacity) of the refrigeration cycle 1 becomes constant. For example, the compressor 11 is controlled so that the temperature TE of the air-side evaporator 14 becomes a constant temperature (e.g., 2°

C.). For example, the compressor 11 is controlled so that the temperature TE of the cooling water cooled by the cooling-water-side evaporator 17 becomes a constant temperature.

(3) The rotational speed of the high-temperature-side pump 21 is controlled so as to be constant. Specifically, in the high-temperature cooling water circuit 20, the rotational speed of the high-temperature-side pump 21 is controlled so as to obtain a cooling water flow rate at which heat can be sufficiently transported by the cooling water. For example, the rotational speed of the high-temperature-side pump 21 is controlled so that the cooling water flow rate becomes 10 L/min.

The hatched region of the graph in FIG. 13 illustrates the regulation range for the radiator flow ratio Gw. The hatched region of the graph of FIG. 13 is a region surrounded by a straight line representing an upper limit THL1 (hereinafter referred to as upper limit outlet temperature) of the heater core outlet temperature TH, a straight line representing a lower limit THL2 (hereinafter referred to as lower limit outlet temperature) of the heater core outlet temperature TH, and a curve representing a maximum value THmax (hereinafter referred to as maximum outlet temperature) of the heater core outlet temperature TH.

That is, the heater core 22 is required to blow out air having a temperature equal to or more than the lower limit outlet temperature THL2 and equal to or less than the upper limit outlet temperature THL1. The maximum outlet temperature THmax is the heater core outlet temperature TH when the air heating capacity of the heater core 22 becomes maximum.

The upper limit outlet temperature THL1, the lower limit outlet temperature THL2, and the maximum outlet temperature THmax are expressed by Formulas f1 to f3 below using the radiator flow ratio Gw:

$$THL1=55 \tag{f1}$$

$$THL2=-1.54Gw+5.3 \tag{f2}$$

$$THmax=5.0052Gw^{-1.173} \tag{f3}$$

That is, the maximum outlet temperature THmax increases as the radiator flow ratio Gw decreases. In other words, the curve representing the maximum outlet temperature THmax has a negative slope.

The negative slope of the curve representing the maximum outlet temperature THmax increases as the radiator flow ratio Gw decreases. That is, the curve representing the maximum outlet temperature THmax increases in slope as the radiator flow ratio Gw decreases. In other words, the rate of increase in the maximum outlet temperature THmax with respect to the decrease in the radiator flow ratio Gw increases as the radiator flow ratio Gw decreases.

A first fluctuation range ΔTH1 illustrated in FIG. 13 is an allowable value of the fluctuation range of the heater core outlet temperature TH. In this example, the first fluctuation range ΔTH1 is 7° C., more specifically, ±3.5° C. around the upper limit outlet temperature THL1. The first fluctuation range ΔTH1 is the fluctuation range of the heater core outlet temperature TH, which is considered to be the boundary of whether or not the occupant feels uncomfortable.

A first regulation amount Gw1 illustrated in FIG. 13 is a regulation amount of the radiator flow ratio Gw corresponding to the first fluctuation range ΔTH1 of the heater core outlet temperature TH when the maximum outlet temperature THmax is equal to the upper limit outlet temperature THL1. In this example, the first regulation amount Gw1 is 0.014.

The minimum resolution of the high-temperature-side three-way valve 45 is equal to or less than the first regulation amount Gw1. Specifically, the minimum resolution of the high-temperature-side three-way valve 45 is set to be equal to or less than the first regulation amount Gw1 by setting a gear ratio between the actuator 453 and the valve element 452 of the high-temperature-side three-way valve 45.

Thus, when the high-temperature-side three-way valve 45 regulates the radiator flow ratio Gw, the fluctuation range of the heater core outlet temperature TH can be held within the first fluctuation range ΔTH1, so that the occupant can be restricted from feeling uncomfortable due to the fluctuation of the outlet temperature.

A minimum resolution Gwmin of the high-temperature-side three-way valve 45 can be expressed by Formulas f4 to f7 below:

$$Gwmin \leq Gw1 \tag{f4}$$

$$Gw1=Gwa-Gwb \tag{f5}$$

$$Gwa=f^{-1}(THL1-\Delta TH\tfrac{1}{2}) \tag{f6}$$

$$Gwb=f^{-1}(THL1+\Delta TH\tfrac{1}{2}) \tag{f7}$$

Figure 14:
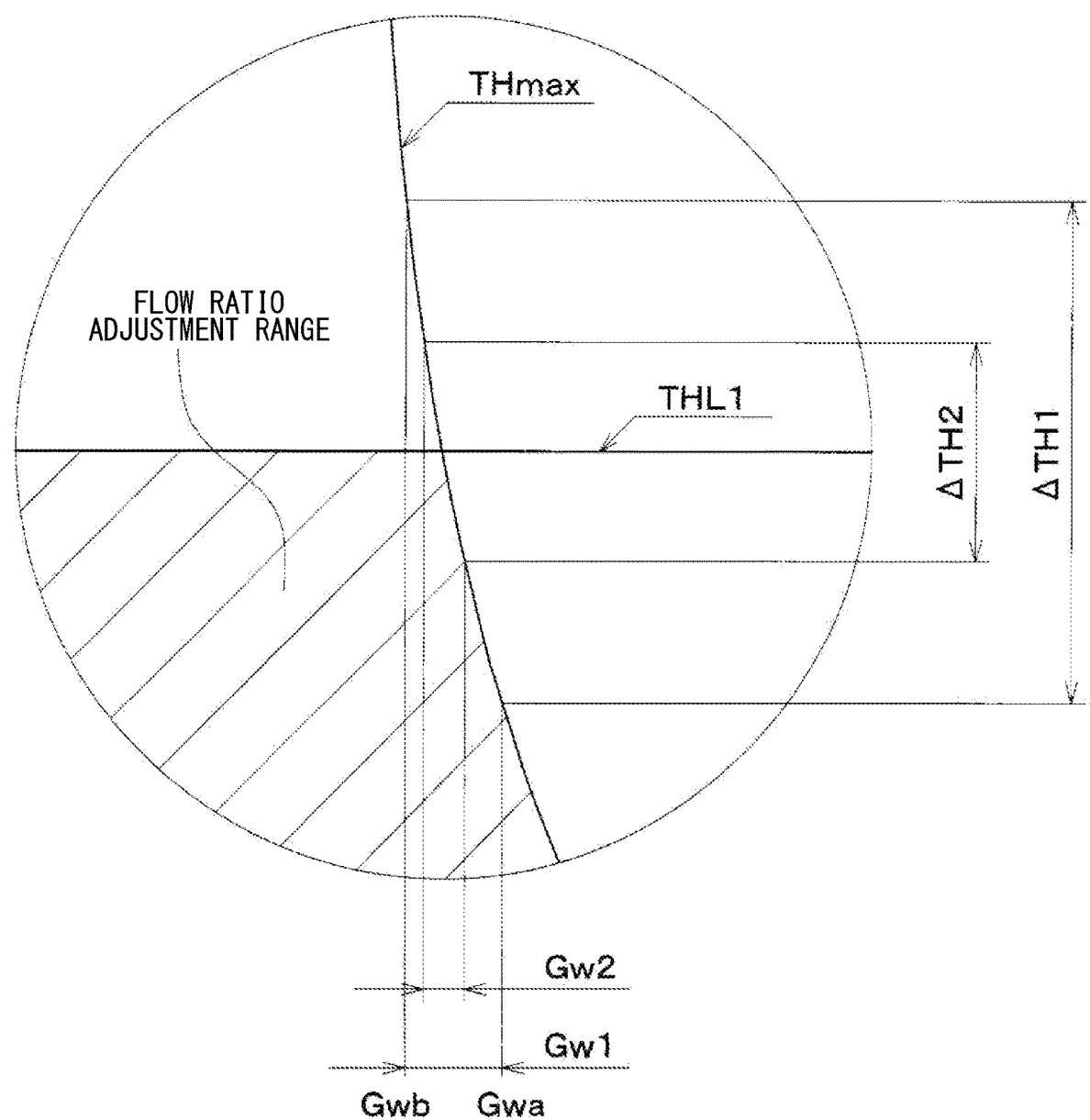
FIG. 14 is an enlarged view of part XIV of FIG. 13.

Here, as illustrated in FIG. 14, Gwa is the radiator flow ratio Gw corresponding to the heater core outlet temperature TH at the lower limit of the first fluctuation range ΔTH1. As illustrated in FIG. 14, Gwb is a radiator flow ratio Gw corresponding to the heater core outlet temperature TH at the upper limit of the first fluctuation range ΔTH1.

$f^{-1}(x)$ in each of Formulas f6 and f7 is the inverse of Formula f3. That is, Formula f3 can be expressed by a function $f(x)=5.0052x^{-1.173}$, and the inverse function of $f(x)$ is expressed by $f^{-1}(x)$.

From the above, the minimum resolution Gwmin of the high-temperature-side three-way valve 45 satisfies the relationship of Formula f8 below:

$$Gwmin \leq f^{-1}(THL1-\Delta TH\tfrac{1}{2})-f^{-1}(THL1+\Delta TH\tfrac{1}{2}) \tag{f8}$$

A second fluctuation range ΔTH2 illustrated in FIG. 13 is the error range of the detected temperature of the heater core inlet water temperature sensor 66. In this example, the second fluctuation range ΔTH2 is 0.4° C., more specifically, ±0.2° C. around the upper limit outlet temperature THL1. The detected temperature of the heater core inlet water temperature sensor 66 can be regarded as the heater core outlet temperature TH. The second fluctuation range ΔTH2 may be an error range of a detected temperature of a sensor for detecting the heater core outlet temperature TH.

A second regulation amount Gw2 illustrated in FIG. 13 is a regulation amount of the radiator flow ratio Gw corresponding to the second fluctuation range ΔTH2 of the heater core outlet temperature TH when the maximum outlet temperature THmax is equal to the upper limit outlet temperature THL1. In this example, the second regulation amount Gw2 is 0.0008.

The minimum resolution of the high-temperature-side three-way valve 45 is equal to or more than the second regulation amount Gw2. Specifically, the minimum resolution of the high-temperature-side three-way valve 45 is set to be equal to or more than the second regulation amount Gw2 by setting a gear ratio between the actuator 453 and the valve element 452 of the high-temperature-side three-way valve 45. Thus, when the high-temperature-side three-way valve 45 regulates the radiator flow ratio Gw, the fluctuation range of the heater core outlet temperature TH can be made equal to or more than the second fluctuation range ΔTH2, so that the minimum resolution of the high-temperature-side three-way valve 45 is restricted from being reduced beyond the detection accuracy of the heater core inlet water temperature sensor 66.

In the present embodiment, as illustrated in FIG. 13, the maximum outlet temperature THmax increases as the radiator flow ratio Gw decreases, and the rate of increase in the maximum outlet temperature THmax with respect to the decrease of the radiator flow ratio Gw increases as the radiator flow ratio Gw decreases.

Thus, by appropriately setting the resolution of the high-temperature-side three-way valve 45, the air heated by the heater core 22 can be heated to an appropriate temperature even when the radiator flow ratio Gw is small.

In the present embodiment, as illustrated in FIG. 14, at the radiator flow ratio Gw when the maximum outlet temperature THmax becomes the upper limit outlet temperature THL1, the high-temperature-side three-way valve 45 can regulate the radiator flow ratio Gw so that the fluctuation range of the maximum outlet temperature THmax becomes equal to or less than the first fluctuation range ΔTH1.

Thus, when the high-temperature-side three-way valve 45 regulates the radiator flow ratio Gw, the fluctuation range of the heater core outlet temperature TH can be held within the first fluctuation range ΔTH1, so that the occupant can be restricted from feeling uncomfortable due to the fluctuation of the outlet temperature.

In the present embodiment, as illustrated in FIG. 14, at the radiator flow ratio Gw when the maximum outlet temperature THmax becomes the upper limit outlet temperature THL1, the high-temperature-side three-way valve 45 can regulate the radiator flow ratio Gw so that the fluctuation range of the heater core outlet temperature TH becomes equal to or more than the second fluctuation range ΔTH2.

Thus, the minimum resolution of the high-temperature-side three-way valve 45 can be restricted from being reduced beyond the detection accuracy of the heater core inlet water temperature sensor 66.

Sixth Embodiment

Figure 15:
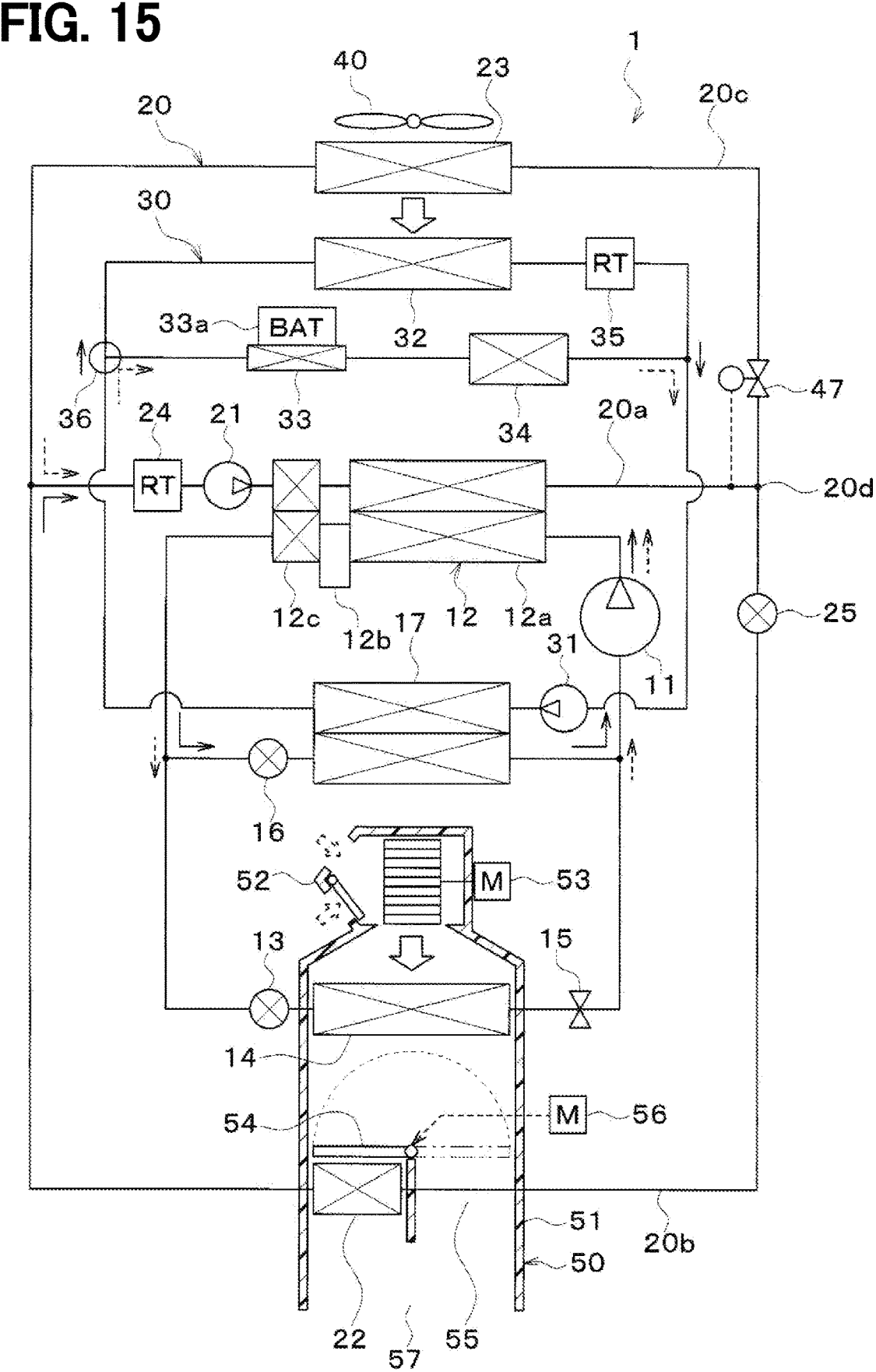
FIG. 15 illustrates an overall configuration diagram of a refrigeration cycle device according to a sixth embodiment.

As illustrated in FIG. 15, in the present embodiment, a thermostat 47 is disposed in the radiator passage 20*c*. The thermostat 47 is a high-temperature heating medium regulator for increasing the opening of the radiator passage 20*c* with the rise of the temperature of cooling water flowing out of the condenser 12. The thermostat 47 is a mechanical mechanism for displacing the valve element by using thermowax that changes in volume in accordance with a change in the temperature of the cooling water.

Thus, when the temperature of the cooling water flowing out of the condenser 12 is low, the thermostat 47 closes the radiator passage 20*c*, whereby heat radiation in the high-temperature-side radiator 23 can be stopped.

The present disclosure is not limited to the embodiments described above but can be variously modified as follows without departing from the spirit of the present disclosure.

In the above embodiment, cooling water is used as the heating medium, but various media such as oil may be used as the heating medium. A nanofluid may be used as the heating medium. A nanofluid is fluid in which nanoparticles of the order of nanometers in diameter are mixed.

In the refrigeration cycle device 10 of the above embodiment, a fluorocarbon refrigerant is used as the refrigerant, but the type of the refrigerant is not limited to this, and a natural refrigerant such as carbon dioxide or a hydrocarbon refrigerant may be used.

The refrigeration cycle device 10 of the above embodiment constitutes a subcritical refrigeration cycle in which the pressure of the high-pressure-side refrigerant does not exceed the critical pressure of the refrigerant but may constitute a supercritical refrigeration cycle in which the pressure of the high-pressure-side refrigerant exceeds the critical pressure of the refrigerant.

In the fourth embodiment, the high-temperature-side radiator 23 and the low-temperature-side radiator 32 are formed as separate radiators, and the high-temperature-side radiator 23 and the low-temperature-side radiator 32 are connected to each other by the common fin 37. In contrast, the high-temperature-side radiator 23 and the low-temperature-side radiator 32 may be constituted as one radiator.

For example, the cooling water tank of the high-temperature-side radiator 23 and the cooling water tank of the low-temperature-side radiator 32 are integrated with each other, whereby the high-temperature-side radiator 23 and the low-temperature-side radiator 32 may be constituted as one radiator.

The high-temperature-side radiator 23 and the low-temperature-side radiator 32 may be a common radiator, whereby the cooling water of the high-temperature cooling water circuit 20 and the cooling water of the low-temperature cooling water circuit 30 may be switched and introduced into the common radiator. The cooling water of the high-temperature cooling water circuit 20 and the cooling water of the low-temperature cooling water circuit 30 may be introduced into one common radiator at an arbitrary flow rate.

The switching of the introduced cooling water and the regulation of the flow ratio can be performed using the on-off valve the flow rate regulation valve of the cooling water passage.

In the above embodiment, the battery 33 is cooled by the flow of the cooling water of the low-temperature cooling water circuit 30 in the battery 33, but the battery 33 can be thermally conductive with a battery cooler (not illustrated), and the battery 33 can be cooled by the flow of the cooling water of the low-temperature cooling water circuit 30 in the battery cooler.

A battery air cooler (not illustrated) may be used to cool the battery 33. The battery air cooler is a heat exchanger that exchanges heat between the cooling water of the low-temperature cooling water circuit 30 and the air blown to the battery 33 to cool the air blown to the battery 33

In the first embodiment, the radiator passage open/close valve 26 and the heater core passage open/close valve 25 are solenoid valves with openings arbitrarily regulatable. In contrast, the radiator passage open/close valve 26 and the heater core passage open/close valve 25 may be solenoid valves that simply open and close, and the time average opening may be arbitrarily regulated by intermittent opening and closing.

In the above embodiment, the opening of at least one of the heater core passage 20*b* and the radiator passage 20*c* is regulated to regulate the flow rates of the cooling water flowing in the heater core 22 and the cooling water flowing in the high-temperature-side radiator 23. In addition to this, the discharge flow rate of the high-temperature-side pump 21 may also be regulated in combination to regulate the flow rate of the cooling water flowing in the heater core 22 and the flow rate of the cooling water flowing in the high-temperature-side radiator 23.

In the fifth embodiment, the second fluctuation range ΔTH2 is the error range of the detected temperature of the heater core inlet water temperature sensor 66, but the second fluctuation range ΔTH2 may be the error range of the detected temperature of the sensor for detecting the heater core outlet temperature TH.

It should be appreciated that the present disclosure is not limited to the embodiments described above and can be modified appropriately within the scope of the disclosure. The embodiments above are not irrelevant to one another and can be combined appropriately unless a combination is obviously impossible.

What is claimed is:

1. A refrigeration cycle device comprising:
    a high-temperature heating medium circuit through which a high-temperature heating medium circulates;
    an air heater configured to heat air blown into a cabin by exchanging heat between the high-temperature heating medium and the air;
    a radiator configured to radiate heat to air outside the cabin by exchanging heat between the high-temperature heating medium and the air outside the cabin;
    a compressor that sucks, compresses, and discharges a refrigerant;
    a high-pressure-side heat exchanger configured to radiate heat from the refrigerant to the high-temperature heating medium by exchanging heat between the high-pressure refrigerant discharged from the compressor and the high-temperature heating medium;
    a decompression part that decompresses the refrigerant subjected to the heat exchange by the high-pressure-side heat exchanger;
    an evaporator that absorbs heat into the refrigerant decompressed by the decompression part to evaporate the refrigerant; and
    a flow rate regulator that regulates a radiator-side flow ratio of a flow rate of the high-temperature heating medium flowing in the radiator to a flow rate of the high-temperature heating medium flowing in the high-pressure-side heat exchanger, wherein
    a maximum outlet temperature that is a maximum value of a temperature of air heated by the air heater increases as the radiator-side flow ratio decreases, and
    a rate of increase in the maximum outlet temperature with respect to a decrease in the radiator-side flow ratio increases as the radiator-side flow ratio decreases.

2. The refrigeration cycle device according to claim 1, wherein the flow rate regulator is capable of regulating the radiator-side flow ratio so that a fluctuation range of the temperature of the air heated by the air heater becomes equal to or less than an allowable value at the radiator-side flow ratio when the maximum outlet temperature becomes an upper limit outlet temperature that is an upper limit of the temperature of the air heated by the air heater.

3. The refrigeration cycle device according to claim 2, further comprising a temperature detector that detects the temperature of air heated by the air heater or the high-temperature heating medium flowing into the air heater, wherein
    the flow rate regulator is capable of regulating the radiator-side flow ratio so that the fluctuation range of the temperature of the air heated by the air heater becomes equal to or more than an error range of the detected temperature of the temperature detector at the radiator-side flow ratio when the maximum outlet temperature becomes the upper limit outlet temperature.

4. The refrigeration cycle device according to claim 1, wherein the maximum outlet temperature THmax is expressed by a relationship:

$$THmax = 5.0052 Gw^{-1.173}$$

with respect to the radiator-side flow ratio Gw.

* * * * *